US010401996B2

(12) United States Patent
Orita et al.

(10) Patent No.: US 10,401,996 B2
(45) Date of Patent: Sep. 3, 2019

(54) DISPLAY PANEL AND DISPLAY APPARATUS

(71) Applicant: Mitsubishi Electric Corporation, Chiyoda-ku (JP)

(72) Inventors: Tae Orita, Tokyo (JP); Naoki Nakagawa, Tokyo (JP); Takeshi Ono, Tokyo (JP); Masafumi Agari, Tokyo (JP); Seiichiro Mori, Tokyo (JP); Takashi Miyayama, Tokyo (JP); Takuji Imamura, Kumamoto (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/123,570

(22) PCT Filed: Dec. 22, 2014

(86) PCT No.: PCT/JP2014/083820
§ 371 (c)(1),
(2) Date: Sep. 2, 2016

(87) PCT Pub. No.: WO2015/133041
PCT Pub. Date: Sep. 11, 2015

(65) Prior Publication Data
US 2017/0075461 A1 Mar. 16, 2017

(30) Foreign Application Priority Data
Mar. 5, 2014 (JP) ................... 2014-042226

(51) Int. Cl.
G06F 3/041 (2006.01)
G06F 3/044 (2006.01)
(Continued)

(52) U.S. Cl.
CPC ........ G06F 3/0412 (2013.01); G02F 1/13338 (2013.01); G02F 1/133345 (2013.01);
(Continued)

(58) Field of Classification Search
CPC .... G06F 3/0412; G06F 3/044; G02F 1/13338; G02F 1/13345
See application file for complete search history.

(56) References Cited

U.S. PATENT DOCUMENTS 5,844,506 A   12/1998  Binstead
6,137,427 A   10/2000  Binstead
(Continued)

FOREIGN PATENT DOCUMENTS

CN    103257779 A    8/2013
CN    203179574 U    9/2013
(Continued)

OTHER PUBLICATIONS

Japanese Office Action dated Jan. 17, 2017 in Patent Application No. 2016-506095 (with English translation).
(Continued)

*Primary Examiner* — Alexander Eisen
*Assistant Examiner* — Kebede T Teshome
(74) *Attorney, Agent, or Firm* — Oblon, McClelland, Maier & Neustadt, L.L.P.

(57) ABSTRACT

A display panel includes: a display functional portion formed of a display functional layer sandwiched between transparent substrates facing each other; and a touch screen portion that includes lower wiring and upper wiring made of a conductive metal material, that includes an interlayer insulating film located between the lower wiring and the upper wiring, and that includes a protective film covering the lower wiring, the upper wiring, and the interlayer insulating film. The lower wiring of the touch screen portion is formed on a surface on an observer side of the transparent substrate on the observer side.

12 Claims, 14 Drawing Sheets

(51) Int. Cl.
*G02F 1/1333* (2006.01)
*G02F 1/1335* (2006.01)

(52) U.S. Cl.
CPC ........ *G02F 1/133502* (2013.01); *G06F 3/044* (2013.01); *G06F 2203/04103* (2013.01); *G06F 2203/04112* (2013.01)

(56) References Cited

U.S. PATENT DOCUMENTS

| | | | |
|---|---|---|---|
| RE40,867 E | 8/2009 | Binstead | |
| 7,859,521 B2 | 12/2010 | Hotelling et al. | |
| 8,217,913 B2 | 7/2012 | Hotelling et al. | |
| 8,269,744 B2 | 9/2012 | Agari et al. | |
| 8,363,027 B2 | 1/2013 | Hotelling et al. | |
| 8,390,598 B2 | 3/2013 | Agari et al. | |
| 8,502,799 B2 | 8/2013 | Hotelling et al. | |
| 9,069,401 B2 | 6/2015 | Utsunomiya et al. | |
| 9,134,560 B2 | 9/2015 | Hotelling et al. | |
| 9,295,176 B2 | 3/2016 | Ohtani et al. | |
| 2011/0291994 A1 | 12/2011 | Kwak et al. | |
| 2012/0140158 A1* | 6/2012 | Nakahara | G02F 1/1345 349/139 |
| 2013/0299222 A1 | 11/2013 | Lee et al. | |
| 2014/0132906 A1* | 5/2014 | Yoshioka | G02F 1/134309 349/141 |
| 2015/0177876 A1* | 6/2015 | Ishii | G06F 3/044 345/174 |
| 2015/0277174 A1 | 10/2015 | Utsunomiya et al. | |
| 2015/0363032 A1 | 12/2015 | Hotelling et al. | |
| 2017/0221611 A1* | 8/2017 | Tamagawa | H01B 12/06 |

FOREIGN PATENT DOCUMENTS

| | | | |
|---|---|---|---|
| JP | 9-511086 A | | 11/1997 |
| JP | 2008-185785 A | | 8/2008 |
| JP | 2009-294815 A | | 12/2009 |
| JP | 2010-61502 A | | 3/2010 |
| JP | 2010-231773 A | | 10/2010 |
| JP | 2011-253519 A | | 12/2011 |
| JP | 2012-103761 A | | 5/2012 |
| JP | 2012-123454 A | | 6/2012 |
| JP | 2012123454 A | * | 6/2012 |
| JP | 2013-45261 A | | 3/2013 |
| JP | 2013045261 A | * | 3/2013 |
| JP | 2013-105255 A | | 5/2013 |
| JP | 2013-178655 A | | 9/2013 |
| JP | 2013-235593 A | | 11/2013 |
| JP | 2014-10671 A | | 1/2014 |
| JP | 2014-16944 A | | 1/2014 |
| JP | 2014-21522 A | | 2/2014 |
| KR | 10-2014-0016627 A | | 2/2014 |
| WO | 95/27334 A1 | | 10/1995 |
| WO | WO 2014/010620 A1 | | 1/2014 |

OTHER PUBLICATIONS

Office Action dated Apr. 25, 2017 in Japanese Patent Application No. 2016-506095 with partial English translation.
Office Action dated Jun. 12, 2018, in Chinese Patent Application No. 201480076804.8 w/Computer-Generated Translation, citing documents AO, AP, and AQ.
International Search Report dated Feb. 3, 2015 in PCT/JP14/083820 filed Dec. 22, 2014.
International Preliminary Report on Patentability and Written Opinion of the International Searching Authority dated Sep. 6, 2016 in PCT/JP2014/083820 filed Dec. 22, 2014 (with English translation).

* cited by examiner

ARRANGEMENT INTERVAL BETWEEN UPPER ELECTRODE AND LOWER ELECTRODE
/THICKNESS OF COLOR FILTER SUBSTRATE

DISPLAY PANEL AND DISPLAY APPARATUS

TECHNICAL FIELD

The present invention relates to a display panel including a touch screen, a display apparatus including the display panel, and a method for manufacturing a liquid crystal panel including the touch screen.

BACKGROUND ART

A touch panel has been widely known as a device that detects a position (hereinafter may be referred to as a "touch position") indicated by an indicator, such as a finger of a user and a pen, on a touch screen and outputs the touch position. A plurality of detection techniques of a touch panel for detecting a touch position are known. One of electrical capacitance touch panels is a projected capacitive touch panel.

The projected capacitive touch panel can detect a touch position in a case where a surface of a touch screen on a user side (hereinafter may be referred to as a "front-side surface") is covered with a protective plate such as a glass plate having a thickness of approximately several millimeters. The projected capacitive touch panel has several advantages such as excellent ruggedness due to the placement of the protective plate on the front-side surface and a long life due to the absence of any movable part.

A touch screen of the projected capacitive touch panel is formed of detection row-direction wiring for detecting coordinates of a touch position in a row direction and detection column-direction wiring for detecting coordinates of the touch position in a column direction (for example, see Patent Document 1). In the following description, the detection row-direction wiring and the detection column-direction wiring may be collectively referred to as "detection wiring."

Patent Document 1 discloses a touch pad system corresponding to the touch panel. The touch pad system disclosed in Patent Document 1 includes, as the detection wiring for detecting an electrostatic capacitance (hereinafter may be simply referred to as a "capacitance"), a first series of conductive elements formed on a thin dielectric film and a second series of conductive elements formed above the first series of conductive elements with an insulating film therebetween. These series of conductive elements do not electrically contact each other. One group of the first series of conductive elements and the second series of conductive elements when viewed in the direction of the normal to the front-side surface overlaps the other group, forming intersections without electrically contacting each other.

A detection circuit detects a capacitance (hereinafter may be referred to as a "touch capacitance") formed between an indicator such as a finger and the conductive elements as the detection wiring, to thereby specify coordinates of a touch position of the indicator. The touch position between the conductive elements can be interpolated by a relative value of a detection capacitance of one or more conductive elements.

In the following description, a member being a transparent dielectric substrate on which the detection column-direction wiring and the detection row-direction wiring are located is referred to as a "touch screen," and a device being the touch screen connected to the detection circuit is referred to as a "touch panel." In the touch screen, a region where a touch position can be detected is referred to as an "operation region" or a "detectable area."

To thoroughly detect a touch position of an indicator in the operation region of the touch screen, the detection wiring needs to be disposed closely to each other in the operation region. The detection wiring being disposed closely to each other in the operation region in such a manner needs to be prevented from being visually identified by the user.

The detection wiring made of a transparent conductive film such as indium tin oxide (ITO) is less likely to be visually identified by the user. However, the transparent conductive film such as the ITO has a relatively high electrical resistance (hereinafter may be simply referred to as a "resistance"), resulting in the disadvantage of increasing the touch screen in size. Moreover, corrosion of the transparent conductive film such as the ITO relatively easily occurs between the other metal wiring and the transparent conductive film, causing a break in the wiring. For the use of a liquid crystal display (LCD) on which the touch screen is mounted, stability against humidity and water droplets is the challenge.

A metal material having a low resistance, for example, silver or aluminum, may be used as a material for the detection wiring. The detection wiring formed of wiring of the metal material (hereinafter may be referred to as "metal wiring") may have a reduced resistance, but the metal wiring is opaque, so that the metal wiring is easily visually identified. There is a technique for making the metal wiring thin and in a mesh pattern to reduce the visibility of the metal wiring and to increase transmittance of the touch screen. Patent Document 2 discloses a projected capacitive touch screen formed of thin metal wiring.

When the thin metal meshed wiring is disposed closely in the operation region of the touch screen, a parasitic capacitance between the detection column-direction wiring and the detection row-direction wiring (hereinafter may be referred to as "line capacity") increases significantly. This results in harmful effects, for example, an increase in wiring delay and an increase in noise.

The wiring delay may be relieved to some extent by reducing wiring resistance. Patent Document 3, for example, discloses a technique for reducing wiring resistance to relieve wiring delay.

The touch screen disclosed in Patent Document 3 is formed of the detection row-direction wiring and the detection column-direction wiring, and each of which has a zigzag pattern of thin straight metal wiring, and thus both of low resistance and reduced line capacity are achieved.

In the touch screen disclosed in Patent Document 3, row-direction bundle wiring includes a plurality of detection row-direction wires that extend substantially in the row direction and are electrically connected to each other, and column-direction bundle wiring includes a plurality of detection column-direction wires that extend substantially in the column direction and are electrically connected to each other. This allows uniform detection of a touch capacitance including a capacitance between an indicator such as a finger and the detection row-direction wiring and a capacitance between the indicator and the detection column-direction wiring.

However, as disclosed in Patent Document 1 to Patent Document 3, a display apparatus on which the touch screen is mounted has a thickness and a weight increased because the detection wiring is formed on a transparent substrate other than a display panel and the transparent substrate is located on the display panel. The increase in the thickness and weight is the important challenge to mobile phones that need to be thin and light.

Patent Document 4 and Patent Document 5 disclose, as a means of reducing a thickness and a weight of a display apparatus on which a touch screen is mounted to apply the display apparatus to a mobile phone or the like, techniques for integrating the functions of the touch screen inside the display panel or on the surface of the display panel. The technique for integrating the touch screen in the display panel as in Patent Document 4 is referred to as an in-cell technique, and the technique for integrating the touch screen on the surface of the display panel as in Patent Document 5 is referred to as an on-cell technique.

PRIOR ART DOCUMENT

Patent Document

Patent Document 1: Japanese Unexamined Patent Application Publication (Translation of PCT Application) No. 9-511086 (1997)
Patent Document 2: Japanese Patent Application Laid-Open No. 2012-103761
Patent Document 3: Japanese Patent Application Laid-Open No. 2010-61502
Patent Document 4: Japanese Patent Application Laid-Open No. 2010-231773
Patent Document 5: Japanese Patent Application Laid-Open No. 2008-185785

SUMMARY OF INVENTION

Problems to be Solved by the Invention

For the in-cell technique, the detection wiring of the touch screen is formed on a thin film transistor (TFT) array substrate in the display panel. Thus, the detection wiring and the insulating layer are protected from moisture outside or a chemical substance, and the display panel having excellent environmental resistance can be achieved.

However, the detection wiring is formed in the display panel, so that a color filter substrate being part of the display panel and a polarizing plate and a protective plate that are located on the color filter substrate are located between the detection wiring and a touch position. As a result, a change in capacitance needed for detecting the touch position is decreased, which decreases detection sensitivity. Further, the detection wiring is formed close to electrode wiring for driving the display panel, thereby increasing noise caused by the drive of the display panel.

On the other hand, for the on-cell technique, only the polarizing plate and the protective plate are sandwiched between an indicator such as a finger and the detection wiring. Further, the electrode wiring for driving the display panel and the detection wiring are formed with the color filter substrate therebetween. Thus, the noise caused by the drive of the display panel is relatively small while a signal-to-noise ratio for detecting the touch position is high.

However, the detection wiring and the insulating layer are formed on the surface of the display panel, thereby being easily affected by the moisture from the outside and the chemical substance. Further, the detection wiring and the insulating film are formed after the display panel is formed, so that processes and temperature are limited and a touch screen having excellent water resistance and excellent chemical resistance cannot be formed. For this reason, the touch screen is hardly applied to on-vehicle equipment that needs to be thin and light and to have high environmental resistance, or hardly applied for the industrial use. Moreover, with the limitations on the processes and temperature, an insulating film having high transmittance is hardly formed, and a yellowish display screen and a decrease in transmittance occur.

As described above, both of high detection sensitivity and high environmental resistance are hardly achieved in the conventional display panel in which the touch screen functions are integrated to reduce the thickness and weight. Any of the techniques do not propose the solutions that achieve the detection sensitivity of the touch position and the environmental resistance of the display panel.

The present invention has been made in view of the above mentioned problems, and an object thereof is to provide a display panel including a touch screen that is thin and light, that has excellent environmental resistance to a hostile usage environment such as the outside, and that has excellent detection sensitivity of a touch position.

Means to Solve the Problems

A display panel according to the present invention includes: a display functional portion formed of a display functional layer sandwiched between a first substrate located on an observer side and a second substrate located opposite to the observer side; and a touch screen portion that includes an upper wire and a lower wire made of a conductive metal material, that includes an interlayer insulating film located between the lower wire and the upper wire, and that includes a protective film covering the lower wire, the upper wire, and the interlayer insulating film. The lower wire of the touch screen portion is formed on a surface of the first substrate on the observer side.

The present invention is also a method for manufacturing a liquid crystal panel that includes: a detection wiring formation step of forming a touch screen portion including a lower wire, an upper wire, an interlayer insulating film, and a protective film on a surface on an observer side of a first substrate located on the observer side, the lower wire and the upper wire being made of a conductive metal material, the interlayer insulating film located between the lower wire and the upper wire electrically insulating the lower wire from the upper wire, the protective film covering the lower wire, the upper wire, and the interlayer insulating film; a color filter layer formation step of forming a color filter layer on a surface opposite to the surface of the first substrate on the observer side after the detection wiring formation step; a TFT array substrate manufacturing step of forming a pixel electrode and a thin-film transistor that drive liquid crystals, on a second substrate; and an assembly step of injecting a liquid crystal layer between the first substrate and the second substrate.

Effects of the Invention

The display panel according to the present invention has the above-mentioned configuration, so that high detection sensitivity and high environmental resistance can be achieved in the display panel that is thin and light and includes the touch screen functions integrated therein.

DESCRIPTION OF EMBODIMENTS

First Embodiment

A display panel of the present invention is a touch-screen-integrated-display panel. This embodiment shows a liquid crystal panel in which the touch screen is integrated as an example. However, the display panel is not limited to the liquid crystal panel as long as the display panel includes a portion (may be referred to as a display functional portion) formed of a display functional layer that has display functions and that is sandwiched between two transparent substrates facing each other. For example, an organic electroluminescence (EL) panel, an electronic paper panel, or the like may also include a touch screen integrated on a transparent substrate being a surface on a user side of each panel.

Figure 1:
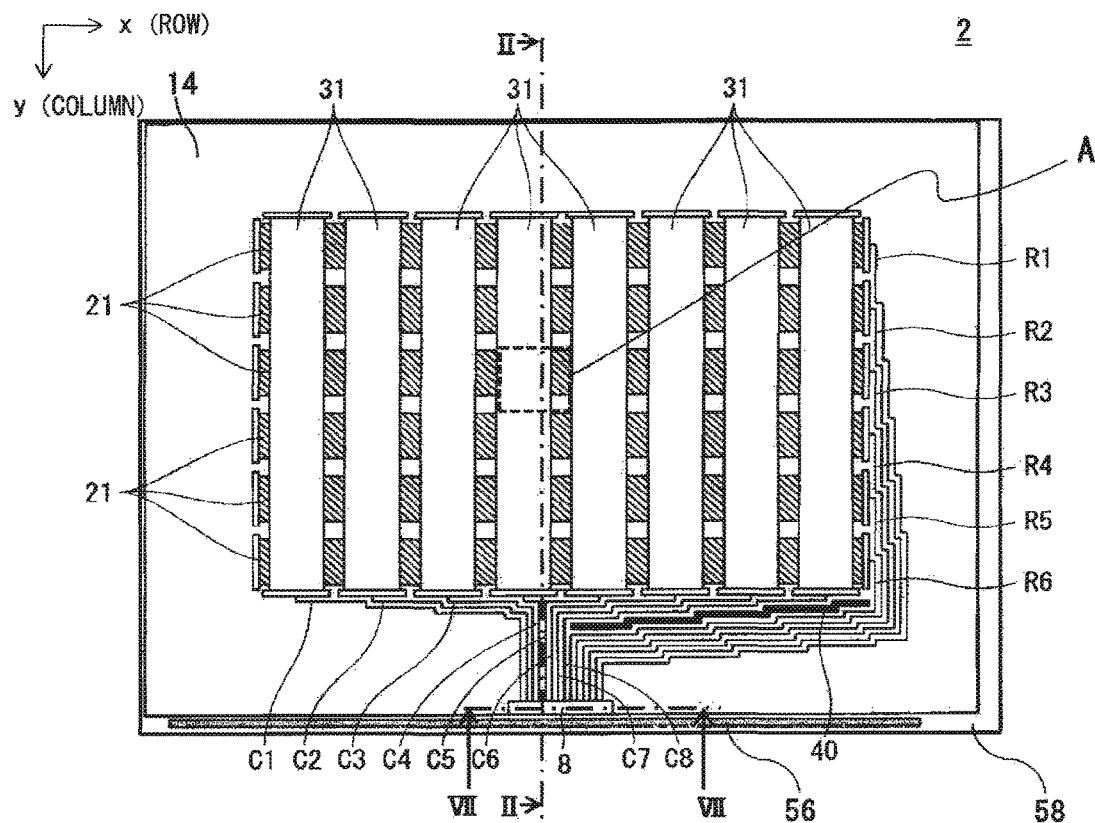
FIG. 1 is a plan view showing an overall configuration of a display panel according to a first embodiment.
Figure 2:
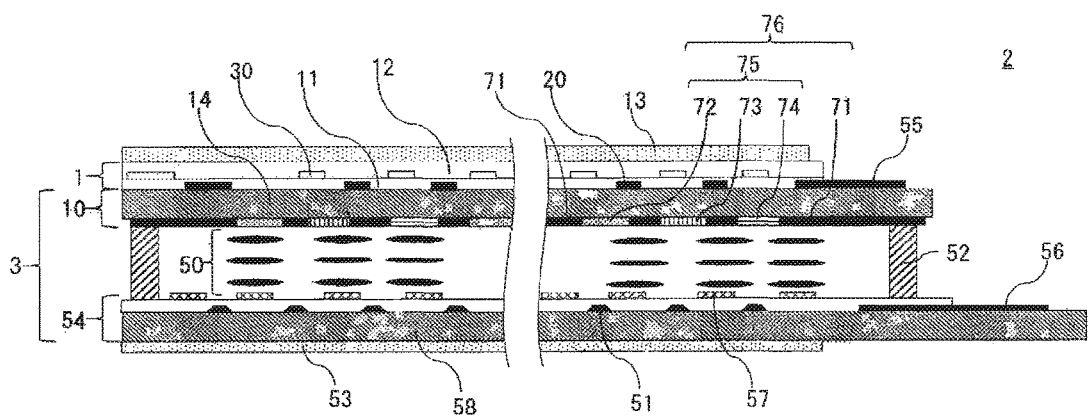
FIG. 2 is a cross-sectional view of the display panel according to the first embodiment.
Figure 3:
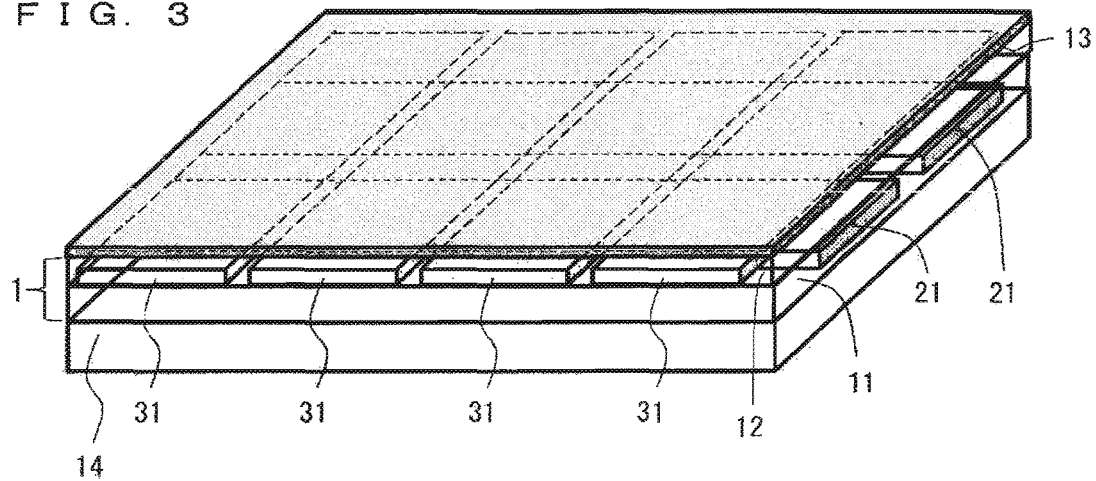
FIG. 3 is a perspective view of a touch screen portion according to the first embodiment.

First, an overall configuration of a display panel 2 of the present invention is described in detail with reference to the drawings. FIG. 1 is a plan view schematically showing the configuration of the display panel 2 in a first embodiment of the present invention. FIG. 2 is a cross-sectional view taken along a II-II line in FIG. 1. FIG. 3 is a perspective view schematically showing a configuration of a detectable area of the touch screen integrated in the display panel 2. In addition, FIG. 1 is a projective view when viewed in the direction of the normal to a surface of the display panel 2. The surface of the display panel 2 is a front surface that faces the user of the display panel 2. The direction of the normal is a direction perpendicular to the surface of the display panel 2. Hereinafter, the "projective view" represents a projective view when viewed in this direction, namely, the direction of the normal to the display panel 2.

As shown in FIG. 2, the display panel 2 includes a touch screen portion 1, a color filter substrate 10, a TFT array substrate 54, a liquid crystal layer 50 that is sandwiched between the color filter substrate 10 and the TFT array substrate 54 and is sealed with a sealing member 52, an upper polarizing plate 13, and a lower polarizing plate 53. In this embodiment, the color filter substrate 10, the TFT array substrate 54, and the liquid crystal layer 50 form a display functional portion 3. A combination of the touch screen portion 1 and the color filter substrate 10 may be referred to as the touch-screen-integrated-color filter substrate 10.

The color filter substrate 10 includes a color filter layer 76 on a transparent substrate 14 such as glass. The color filter layer 76 includes a black matrix 71 and a color material layer 75. The color material layer 75 includes each layer of a Red layer 72, a Green layer 73, and a Blue layer 74. The transparent substrate 14 of the color filter substrate 10 has a front surface being a surface on which the black matrix 71 and the color material layer 75 are formed and a back surface opposite to the front surface. Thus, the color filter substrate 10 is located such that the front surface of the transparent substrate 14 is on the liquid crystal layer 50 side and the back surface is on an observer side. Hereinafter, the back surface of the transparent substrate 14 may be referred to as a back surface of the color filter substrate 10.

The TFT array substrate 54 includes, on a transparent substrate 58 such as glass, a pixel electrode 57, a TFT (not shown) that switches an applied voltage to the pixel electrode 57, TFT array wiring 51 that supplies a voltage for driving the liquid crystal layer 50 to the TFT, and a TFT array terminal 56 for connecting the TFT array wiring 51 to an external circuit. The transparent substrate 58 of the TFT array substrate 54 has a front surface being a surface on which the pixel electrode 57, the TFT, or the like is formed and a back surface opposite to the front surface. The TFT array substrate 54 is located such that the front surface of the transparent substrate 58 is on the liquid crystal layer 50 side, and the TFT array substrate 54 applies voltage to the liquid crystals. For the display panel being the liquid crystal panel, the lower polarizing plate 53 needed for allowing the display panel 2 to function as an optical shutter may be bonded to the back surface of the transparent substrate 58. In addition, the front surface of the transparent substrate 58 may be referred to as a front surface of the TFT array substrate 54.

The touch screen portion 1 in this embodiment is a projected capacitive touch screen. The touch screen portion 1 includes a plurality of row-direction wires 21 for detection, a plurality of column-direction wires 31 for detection, an interlayer insulating film 11 located between the row-direction wires 21 and the column-direction wires 31, and a protective film 12 covering the row-direction wires 21, the column-direction wires 31, and the interlayer insulating film 11. The touch screen portion 1 is formed on the back surface of the color filter substrate 10, namely, the surface on the observer side. Thus, a combination of the transparent substrate 14 being part of the color filter substrate 10 and the touch screen portion 1 corresponds to a conventional touch screen.

As shown in FIG. 1, the plurality of row-direction wires 21 extend in the row direction (corresponding to an x direction in FIG. 1) and are arranged at an interval from each other in the column direction. The plurality of column-direction wires 31 extend in the column direction (corresponding to a y direction in FIG. 1) and are arranged at an interval from each other in the row direction. Hereinafter, the row-direction wires 21 and the column-direction wires 31 may be referred to as "detection wires 21, 31." The row-direction wire 21 is formed of a plurality of lower wires 20 electrically connected to each other. The column-direction wire 31 is formed of a plurality of upper wires 30 electrically connected to each other.

The lower wire 20 is made of a single-layer film or a multilayer film of a conductive metal material such as aluminum, or has a multilayer structure including another conductive material. The predetermined number of lower wires 20 electrically connected to each other forms the row-direction wire 21. The upper wire 30 similar to the lower wire 20 is made of a single-layer film or a multilayer film of a conductive metal material such as aluminum. The predetermined number of upper wires 30 electrically connected to each other forms the column-direction wire 31. The lower wires 20 and the upper wires 30 are omitted from FIG. 1 for the sake of convenience. The specific configurations of the lower wires 20 and the upper wires 30 are described below.

The row-direction wires 21 are each connected, with lead-out wires R1 to R6, to touch screen terminals 55 located at an end portion of the color filter substrate 10. The column-direction wires 31 are each connected, with lead-out wires C1 to C8, to the touch screen terminals 55 located at the end portion of the color filter substrate 10. The plurality of touch screen terminals 55 form a touch screen terminal portion 8. The touch screen terminal portion 8 is connected to an external circuit such as a detection integrated circuit (IC) for detecting a change in capacitance by a touch. The detection IC detects a position indicated by an indicator on the touch screen based on capacitance formed between the row-direction wires 21 and the column-direction wires 31 of the touch screen portion 1 that are located on the surface of the display panel 2, and the indicator.

The lead-out wires R1 to R6 are disposed along the outer periphery of the detectable area in order of proximity to the touch screen terminal portion 8. After reaching the positions where the other lead-out wires are disposed, the lead-out wires R1 to R6 are disposed along the other lead-out wires. In this manner, the lead-out wires R1 to R6 are disposed close to one another in the outer periphery of the detectable area. Similarly, the lead-out wires C1 to C8 are close to one another in the periphery of the detectable area in order of proximity to the touch screen terminal portion 8. After reaching the positions where the other lead-out wires are disposed, the lead-out wires R1 to R6 are disposed along the other lead-out wires.

As described above, the lead-out wires R1 to R6 and the lead-out wires C1 to C8 are disposed as close as possible to one another in the outer periphery of the detectable area, so that the outer peripheral portion of the touch-screen-integrated-display panel 2 can be reduced. Further, a shield electrode 40 formed of the lower wires 20 or the upper wires 30 may be disposed between the lead-out wires R1 to R6 in the row direction and the lead-out wires C1 to C6 in the column direction. The lead-out wires are disposed in such a manner, so that influences of electromagnetic noise generated from the display portion and influences of noise between the lead-out wires can be reduced.

FIG. 3 is a perspective view schematically showing part of the detectable area in which a touch position can be detected in the touch screen portion 1 integrated in the display panel 2. As shown in the diagram, the detectable area of the touch screen portion 1 is a matrix region formed of the plurality of row-direction wires 21 that extend in the horizontal direction (row direction) and the plurality of column-direction wires 31 that overlap the row-direction wires 21 in plan view and extend toward the front in the vertical direction (column direction). A proportion of the lower wires 20 and a proportion of the upper wires 30 that respectively form the row-direction wires 21 and the column-direction wires 31 in the matrix region are preferably the same for display quality. The column-direction wires 31 are formed above the row-direction wires 21 with the interlayer insulating film 11 therebetween. The protective film 12 is located above the row-direction wires 21, the column-direction wires 31, and the interlayer insulating film 11. The upper polarizing plate 13 forming the liquid crystal panel is bonded to the upper surface of the touch screen portion 1.

The interlayer insulating film 11 located between the row-direction wires 21 and the column-direction wires 31 electrically insulates the row-direction wires 21 from the column-direction wires 31. Part or the whole of the interlayer insulating film 11 is made of: a transparent silicon-based inorganic insulating film such as a silicon oxide film, a silicon nitride film, and a silicon oxynitride film; a transparent inorganic insulating film made of metal oxides such as alumina; an organic inorganic insulating film that has a principal chain made of silicon oxides, silicon nitrides, or silicon oxynitrides, that has a side chain and a functional group bonded to organic compounds, and that is made of a polymeric material; or a material for an organic insulating film that has a principal chain made of carbon and that is obtained by heat-curing resin such as acrylic resin, polyimide resin, epoxy resin, novolac resin, and olefin resin which are obtained by being baked at high temperature to be cured.

The protective film 12 is located in the region of the back surface of the transparent substrate 14 except for the region of the touch screen terminals 55, and covers the detection wires 21, 31 and the interlayer insulating film 11. The protective film 12 is made of the same material as the material for the interlayer insulating film 11. For the display panel 2 being the liquid crystal panel, the upper polarizing plate 13 on which antiglare treatment is performed for the liquid crystal panel may be bonded onto the protective film 12 in the display region corresponding to the display portion.

In the display panel 2 in this embodiment, the color filter layer 76 is formed on the front surface of the transparent substrate 14 after the touch screen portion 1 is formed on the back surface of the transparent substrate 14. The interlayer insulating film 11 and the protective film 12 of the touch screen portion 1 are made of a material having sufficient resistance to moisture or a chemical solution used in a usage environment in a process of forming the color filter layer 76 or after the completion, so that damage to the detection wiring due to the chemical solution can be reduced.

Furthermore, the interlayer insulating film 11 and the protective film 12 are made of a film having approximately the same hardness as the hardness of dust or glass suspended in the air, and more specifically, the hardness of greater than or equal to 7. This suppresses occurrence of scratches in a process of forming the touch-screen-integrated-color filter substrate 10, for example, scratches caused by being rubbed against the stage during transportation and scratches occurring in a usage environment, so that the anti-scratch property can be improved. The scratches occurring in the process of forming the touch-screen-integrated-color filter substrate 10 cause broken wires and corrosion, and also cause reduced yields of the display panel because the scratches are visually identified as display defects in response to a change in a state of light transmittance and reflection. Therefore, the film having the hardness of greater than or equal to 7 is used for the interlayer insulating film 11 and the protective film 12, which can reduce the scratches on the substrate and improve the yields.

As shown in FIGS. 1 and 2, the TFT array terminal 56 and the touch screen terminals 55 may be disposed on the same side of the display panel in this embodiment. This can make an outer edge portion (frame portion) of the display panel except for the display region smaller. In the case where the TFT array terminal 56 and the touch screen terminals 55 are disposed on the same side, a drive IC of the TFT array substrate 54 and a detection IC of the touch screen portion 1 are brought closer to each other, and thus a decrease in a signal-to-noise ratio of a touch detection due to the noise of the drive IC may occur. In this case, the TFT array terminal 56 and the touch screen terminals 55 are preferably disposed on different sides of the display panel.

Next, the lower wires 20 and the upper wires 30 that form the detection wires 21, 31 of the display panel in this embodiment are described in detail.

Figure 4:
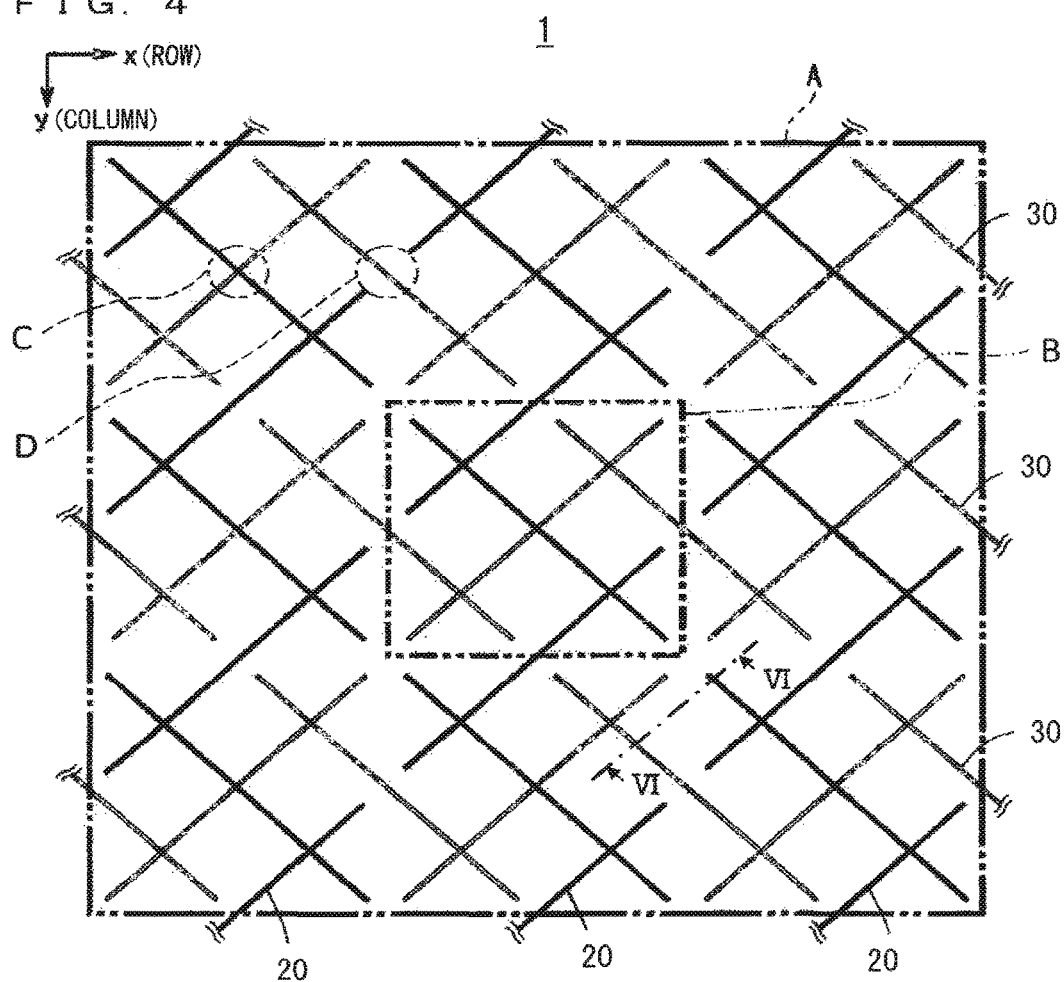
FIG. 4 is an enlarged projective view of a region A in FIG. 1.
Figure 5:
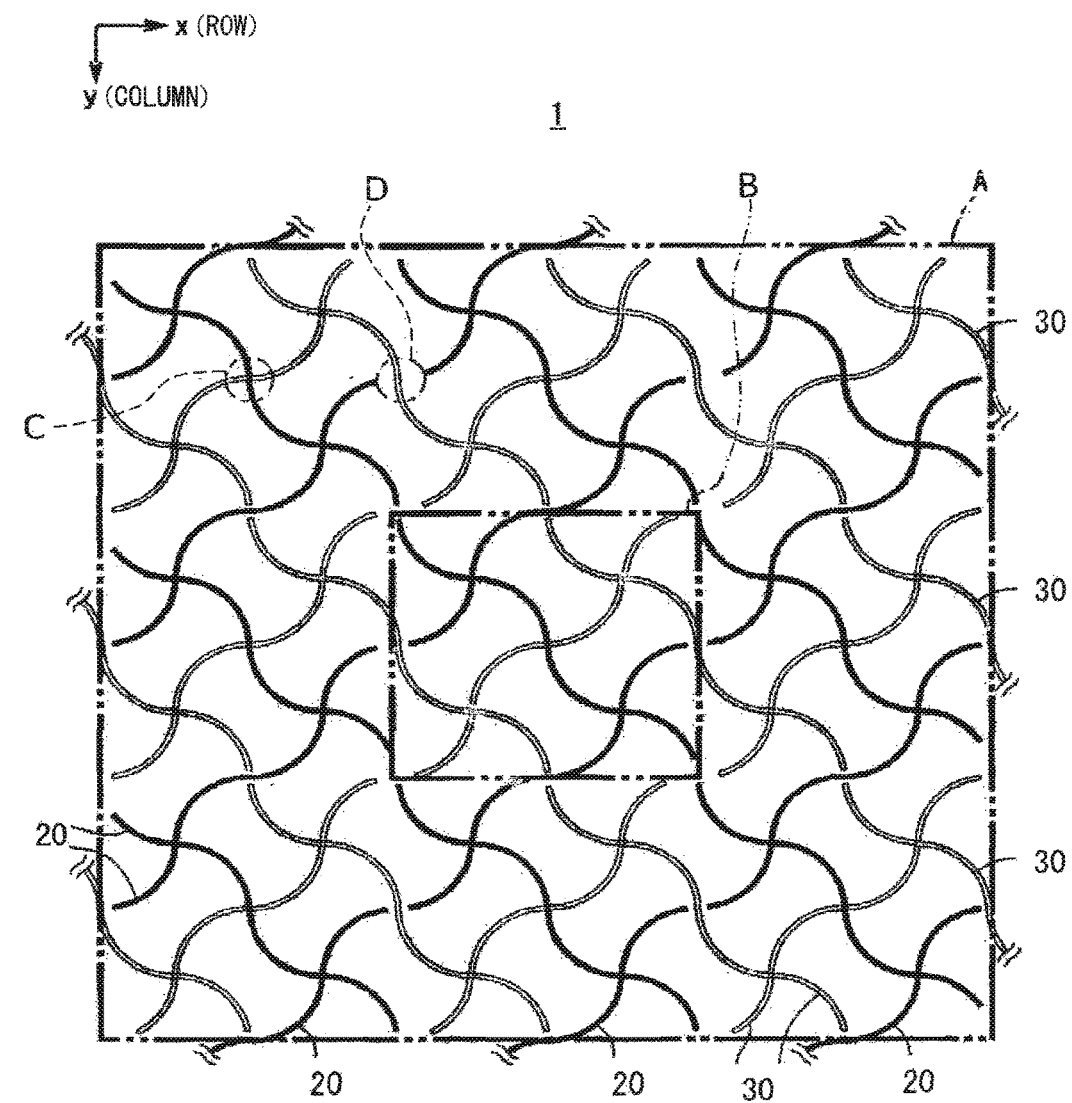
FIG. 5 is an enlarged projective view of another configuration of the region A in FIG. 1.

FIGS. 4 and 5 are enlarged plan views shoving a region A of the touch screen portion 1 in FIG. 1. The detectable area of the touch screen portion 1 is divided into the predetermined number of regions by portions in which the row-direction wires 21 and the column-direction wires 31 intersect each other. One of the predetermined number of regions is the region A. The region A is a region defined by a width of the row-direction wire 21 and a width of the column-direction wire 31, and the region A is a detection unit when a touch position is detected.

FIG. 4 shows the lower wires 20 and the upper wires 30 formed in the region A of the touch screen portion 1 according to this embodiment. The lower wires 20 and the upper wires 30 are straight metal wires inclined 45 in a slanting direction with respect to the row direction or the column direction and located at a predetermined pitch. The plurality of lower wires 20 are repeatedly arranged at a predetermined first pitch in the horizontal direction (X (row) direction in FIG. 4). The plurality of upper wires 30 are repeatedly arranged at a predetermined second pitch in the vertical direction (Y (column) direction in FIG. 4).

The lower wires 20 and the upper wires 30 preferably have an arrangement interval in a range of 0.1 mm to 1 mm. When the lower wires 20 and the upper wires 30 have the arrangement interval of less than 0.1 mm, transmittance of light passing through the touch screen portion 1 decreases. On the other hand, when the arrangement interval exceeds 1 mm, an arrangement interval of portions in which the detection wires 21, 31 intersect each other also increases, and a position detection accuracy of a touch position decreases. Therefore, the lower wires 20 and the upper wires 30 preferably have the arrangement interval in the range of 0.1 mm to 1 mm as described above.

The lower wires 20 and the upper wires 30 do not need to be connected to each other in a mesh pattern in all of the regions, and the lower wires 20 and the upper wires 30 may be appropriately disconnected for the purpose of adjusting the capacitance between the wiring. Of portions indicated by circles with chain double-dashed lines in FIG. 4, C shows an intersection portion in which the wires intersect each other, and D shows a disconnection portion in which the wires are disconnected from each other. Further, a basic pattern B (region indicated by a rectangle with a chain double-dashed line in FIG. 4) is repeatedly disposed in the region A being one touch detection area, and thus variations in detection sensitivity due to positions can be prevented.

Moreover, when the arrangement interval of the lower wires 20 and the upper wires 30 is an integral multiple of a pixel pitch of a display element such as a liquid crystal display (LCD), moiré extremely easily occurs. Therefore, in a case where the display functional portion (display element) or a drawing fixedly illustrated has a periodic structure, the arrangement interval is preferably set other than an integral multiple of a period of the periodic structure.

FIG. 5 shows another specific example of the lower wires 20 and the upper wires 30 according to this embodiment. The lower wires 20 and the upper wires 30 as shown in FIG. 5 are curved wires and formed such that the normal to the curved portion faces all directions when viewed in the direction of the normal to the transparent substrate 14. The center of the curved wires is located at a 45° angle in the slanting direction. Similarly to FIG. 4, the region A is formed by the repetition of the basic pattern B. A required wiring resistance and a required wiring capacitance can be obtained by combining the intersection portion C of the wires and the disconnection portion D of the wires.

As shown in FIG. 5, the curved wires instead of the straight wires allow light reflected from the surface of the wires to be scattered in a wide angle without being concentrated in a specific direction. Thus, the reflected light is prevented from being visually identified as an emission line that decreases the display quality.

Figure 6:
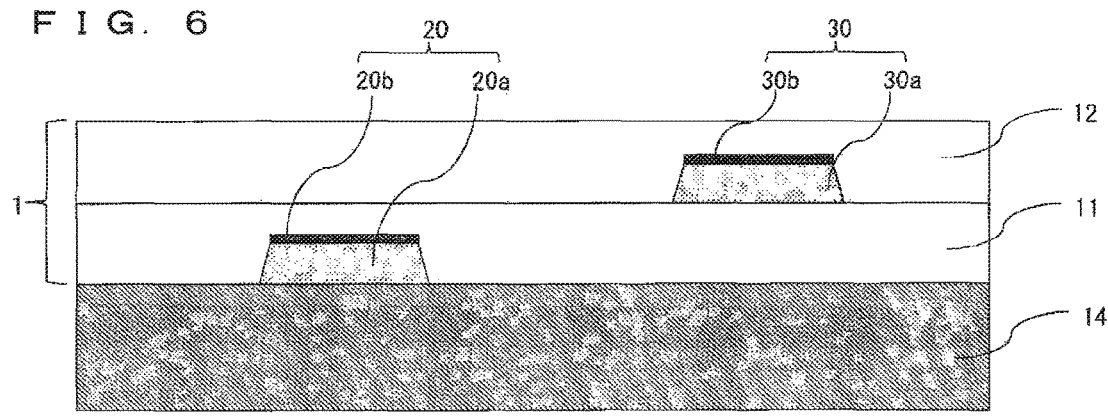
FIG. 6 is a cross-sectional view of the touch screen portion according to the first embodiment.
Figure 7:
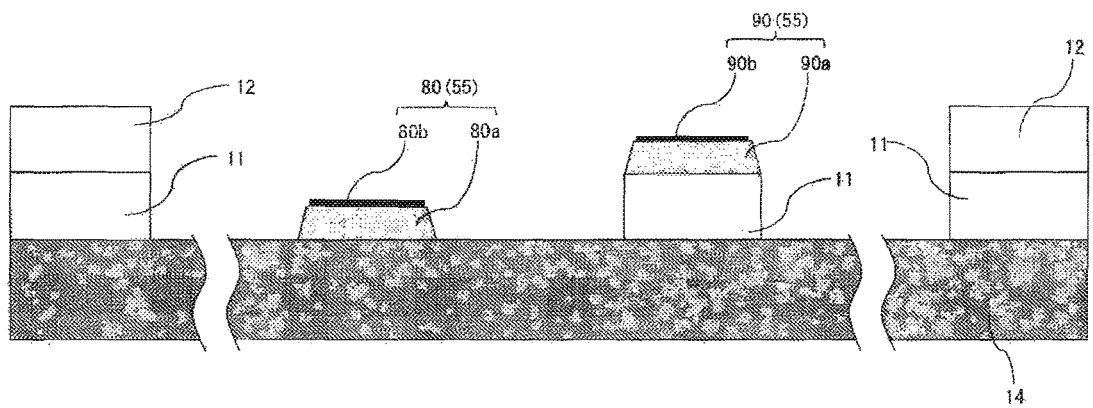
FIG. 7 is a cross-sectional view of the touch screen portion according to the first embodiment.

Next, cross-sectional structures of the lower wire 20 and the upper wire 30 are described. FIG. 6 is a cross-sectional view of the touch screen portion 1 taken along a VI-VI line in FIG. 4. FIG. 7 is a cross-sectional view of the touch screen terminal portion 8 taken along a VII-VII line in FIG. 1.

As shown in FIG. 6, in the touch screen portion 1, the lower wire 20 forming the detection wire 21 is formed of a wiring layer 20a and a reflection reducing layer 20b located on an upper surface of the wiring layer 20a, and the upper wire 30 forming the detection wire 31 is formed of a wiring layer 30a and a reflection reducing layer 30b located on an upper surface of the wiring layer 30a. The lower wire 20 formed of the wiring layer 20a and the reflection reducing layer 20b is located on the back surface of the transparent substrate 14 that forms the color filter substrate 10, namely, the surface of the display panel on the observer side. The interlayer insulating film 11 is formed on the lower wire 20. The upper wire 30 formed of the wiring layer 30a and the reflection reducing layer 30b is located above the lower wire 20 and the interlayer insulating film 11. The protective film 12 is formed in an uppermost layer.

In this embodiment, the lower wire 20 and the upper wire 30 may each have a multilayer structure including an aluminum-based alloy layer and a nitrided aluminum-based alloy layer. Using the aluminum-based alloy layer can reduce a wiring resistance, allowing for the detection wires having a smaller wiring width and a greater pitch between the wires. This can improve light transmittance in the detectable area while increasing the touch screen in size. Further, the multilayer structures including the reflection reducing layers 20b, 30b such as aluminum nitride that are respectively formed on the upper surface of the lower wire 20 and the upper surface of the upper wire 30 can reduce a reflectance of the surfaces of the wires. Moreover, the lower wire 20 and the upper wire 30 each have the multilayer structure including the aluminum-based alloy layer and the nitride aluminum-based alloy layer, but the material is not limited to aluminum, and the lower wire 20 and the upper wire 30 may be made of a single-layer film or a multilayer film of silver, copper, molybdenum, titanium, and an alloy thereof. For example, the wiring layer 20a of the lower wire 20 may have a multilayer St including the aluminum-based alloy layer and the nitride aluminum-based alloy layer, and furthermore, the reflection reducing layer 20b located in the layer above the wiring layer 20a may be made of a transparent wiring material such as ITO.

As shown in FIG. 7, the touch screen terminals 55 forming the touch screen terminal portion 8 include wiring layers 80a, 90a and reflection reducing layers 80b, 90b respectively located on an upper surface of the wiring layer 80a and an upper surface of the wiring layer 90a. The touch screen terminal portion 8 connects the detection wires 21, 31 of the touch screen portion 1 to the external circuit for detecting a touch. Herein, of the touch screen terminals 55, a terminal connected to the row-direction wire 21 is referred to as a row-direction wiring terminal 80, and a terminal connected to the column-direction wire 30 is referred to as a column-direction wiring terminal 90.

The row-direction wiring terminal 80 is formed on the back surface of the transparent substrate 14 forming the color filter substrate 10, namely, the surface of the display panel on the observer side. The wiring layer 80a of the row-direction wiring terminal 80 is made of the same wiring material as that for the wiring layer 20a of the lower wire 20. The reflection reducing layer 80b of the row-direction wiring terminal 80 is made of the same wiring material as that for the reflection reducing layer 20b of the lower wire 20.

The column-direction wiring terminal 90 is formed on the interlayer insulating film 11 formed on the back surface of the transparent substrate 14 that forms the color filter substrate 10. The wiring layer 90a of the column-direction wiring terminal 90 is made of the same wiring material as that for the wiring layer 30a of the upper wire 30. The reflection reducing layer 90b of the column-direction wiring terminal 90 is made of the same wiring material as that for the reflection reducing layer 30b of the upper wire 30.

The reflection reducing layers 80b, 90b of the row-direction wiring terminal 80 and the column-direction wiring terminal 90 are made of an aluminum nitride layer, an ITO layer, or the like. The reflection reducing layers 80b, 90b are preferably made of a material having resistance to an etching chemical solution used in the process of forming the color filter.

As described above, the touch screen portion 1 of the display panel in this embodiment is located on the front surface, which faces the observer, of the transparent substrate 14 forming the color filter substrate 10. The touch screen portion 1 includes: the plurality of row-direction wires 21 made of the conductive metal material and formed of the predetermined number of lower wires 20 electrically connected to each other; the plurality of column-direction wires 31 made of the conductive metal material and formed of the predetermined number of upper wires 30 electrically connected to each other; the transparent interlayer insulating film 11 located between the row-direction wires 21 and the column-direction wires 31 such that the row-direction wires 21 and the column-direction wires 31 are electrically insulated from each other and are three-dimensionally intersecting each other; and the protective film 12 formed so as to cover the row-direction wires 21 and the column-direction wires 31 except for the portions of the touch screen terminals 55 connected to the external detection IC.

In addition, this embodiment gives description of the column-direction wires 31 disposed in the layer above the layer of the row-direction wires 21, but the positional relationship may be reversed such that the row-direction wires 21 are disposed in the layer above the layer of the column-direction wires 31.

The configuration in which the lower wire 20 and the upper wire 30 respectively include the reflection reducing layer 20b and the reflection reducing layer 30b is described, but a configuration in which only one of the lower wire 20 and the upper wire 30 includes the reflection reducing layer may also have no trouble. Similarly, a configuration in which only one of the row-direction wiring terminal 80 and the column-direction wiring terminal 90 includes the reflection reducing layer may also have no trouble.

Furthermore, the row-direction wire 21 does not necessarily need to be formed of the plurality of lower wires 20 connected to each other, and the column-direction wire 31 does not necessarily need to be formed of the plurality of upper wires 30 connected to each other. The row-direction wire 21 may be formed of one lower wire 20, and the column-direction wire 31 may be formed of one upper wire 30.

The column-direction wires 31 are disposed in the layer above the layer of the row-direction wires 21 in this embodiment, but they may be disposed in the same layer and the interlayer insulating film 11 may be disposed on only portions in which the row-direction wires 21 and the column-direction wires 31 overlap each other in plan view, namely, only portions in which they intersect each other, to electrically separate the row-direction wires 21 and the column-direction wires 31 from each other.

Moreover, the user of the display panel in this embodiment performs operation by touching the upper polarizing plate 13 bonded to the surface of the touch screen portion 1 with the indicator such as the finger, but a protective transparent substrate may be bonded onto the upper polarizing plate 13 with a bonding layer for the use, which further emphasizes on environmental resistance. When the indicator touches the protective transparent substrate, a capacitive coupling (touch capacitance) occurs between the indicator and the row-direction wire 21 or the column-direction wire 31 that is the lower portion located in the lower layer of the indicator, and thus the capacitance is changed by the touch. By detecting the touch capacitance, the position in the detectable area, which has been touched, can be specified.

Next, a capacitance formed by the indicator such as the finger, the detection wiring, and the TFT array wiring is described with reference to the drawings.

Figure 24:
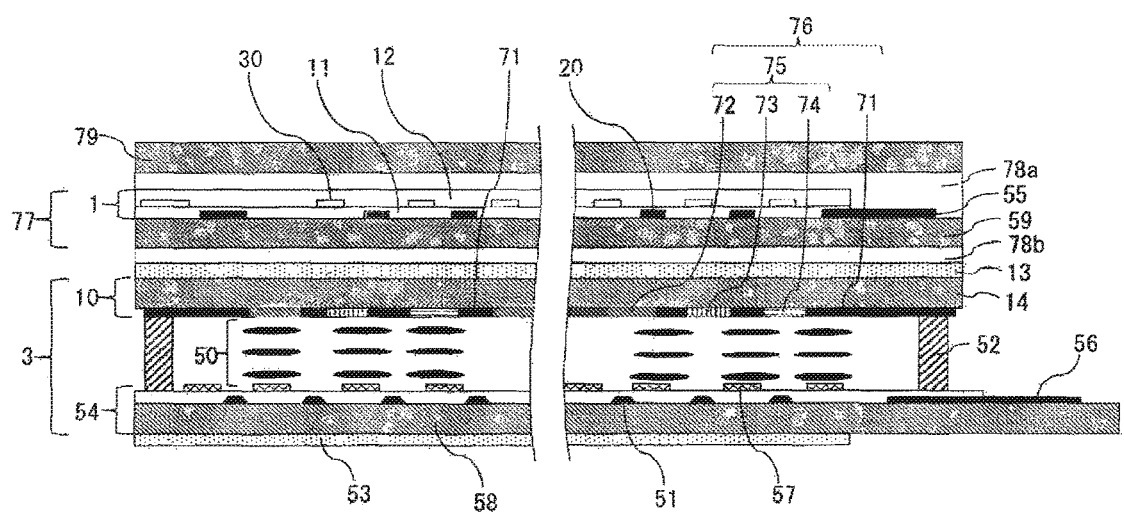
FIG. 24 is a cross-sectional view of a conventional display panel.

FIG. 24 is a cross-sectional view of a conventional display panel in which a touch screen is not integrated on a display functional portion. As shown in the diagram, the conventional display panel includes: a display functional portion 3 formed of a liquid crystal layer 50 sealed between a color filter substrate 10 on which a touch screen portion 1 is not integrated and a TFT array substrate 54; a touch screen substrate 77 including the touch screen portion 1 located on a transparent substrate 59; and a protective glass substrate 79. A lower polarizing plate 53 is bonded to the surface of the display functional portion 3 opposite to the observer while an upper polarizing plate 13 is bonded to the surface of the display functional portion 3 on the observer side. The transparent substrate 59 of the touch screen substrate 77 is bonded to the upper polarizing plate 13 with a bonding layer 78b, and the protective glass substrate 79 is bonded, with a bonding layer 78a, to the surface of the touch screen substrate 77 on which the touch screen portion 1 is located.

For the conventional display panel in which the touch screen is not integrated on the display functional portion as shown in the diagram, the touch screen portion 1 and a color filter layer 76 are formed on different transparent substrates 59, 14. Thus, at least two glass substrates, which are the transparent substrate 14 of the color filter substrate 10 and the transparent substrate 59 of the touch screen substrate 77, and the bonding layer 78b that bonds those members together are located between TFT array wiring 51 and a pixel electrode 57 (may be collectively referred to as LCD wiring), which are a source of noise, and the touch screen portion 1.

In contrast, the display panel of the present invention in which the touch screen is integrated as shown in FIG. 2 includes only the transparent substrate 14 of the color filter substrate 10 between the LCD wiring, which is the source of noise, and the touch screen portion 1. Therefore, a physical distance and an electrical distance in consideration of a dielectric constant between the touch screen portion 1 and the LCD wiring are shorter than those of the conventional display panel, so that a capacitive coupling of the lower wire 20 and the upper wire 30 of the touch screen portion 1 and the LCD wiring increases. As a result, a capacitance (hereinafter may be referred to as a "cross capacitance") formed in the intersection portion of the lower wire 20 and the upper wire 30 decreases.

When the indicator such as the finger touches the touch screen, part of the cross capacitance becomes the capacitance between the indicator, and the lower wire 20 and the upper wire 30, which decreases the cross capacitance. Thus, the touch position of the indicator can be detected based on the change in the cross capacitance. For this reason, if the cross capacitance is decreased by bringing the touch screen portion 1 and the LCD wiring closer to each other, the amount of change in the cross capacitance based on the presence or absence of contact with the finger is relatively decreased, which makes the detection of the presence or absence of the contact with the finger difficult. Thus, the detection sensitivity of the touch screen decreases.

Thus, the distance between the lower wire 20 and the upper wire 30 is set to be shorter than the distance between the touch screen portion 1 and the TFT array wiring 51 in the display panel of the present invention in order to improve the detection sensitivity.

Figure 8:
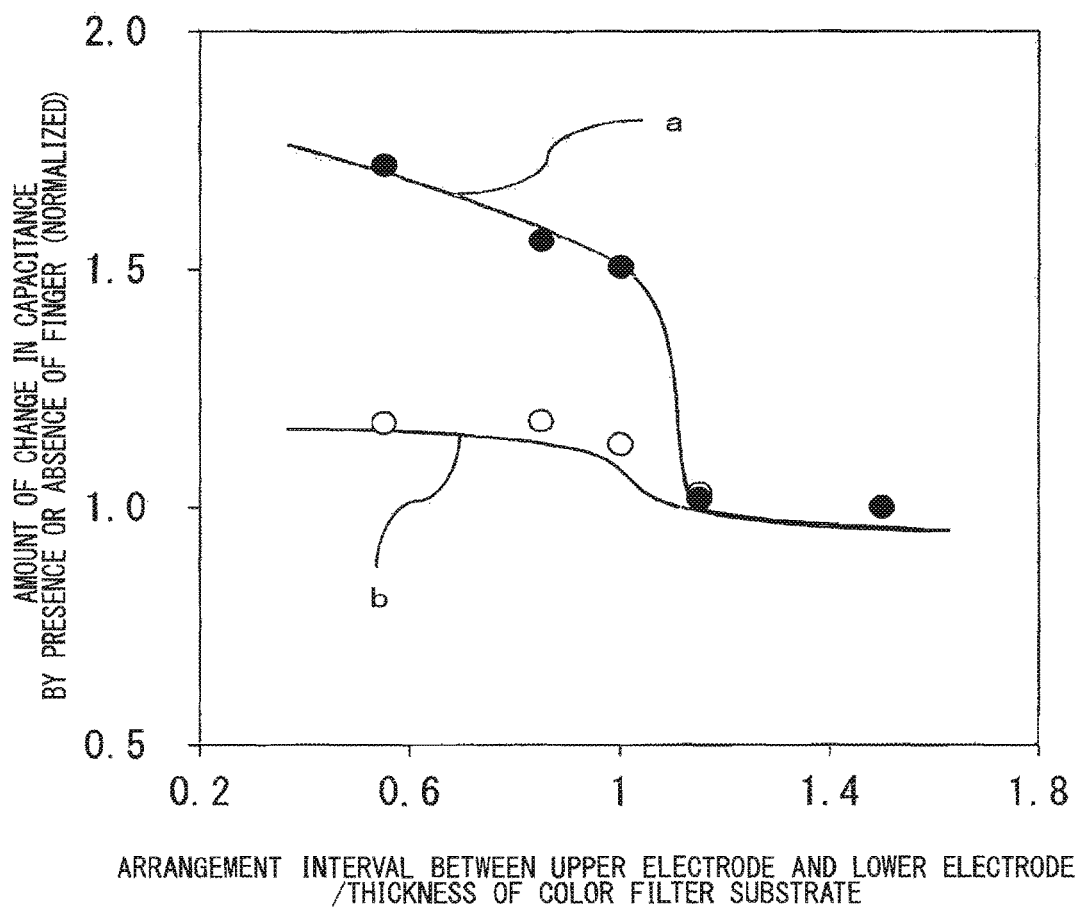
FIG. 8 is a graph showing a relationship between a ratio of an interval between detection wires to a thickness of a color filter substrate and an amount of change in cross capacitance.

Next, a relationship between the distance between the detection wires and the detection sensitivity is described. FIG. 8 is a graph showing a relationship between a ratio of an arrangement interval between an upper electrode 30 and a lower electrode 20 to a thickness of the color filter substrate 10 and an amount of change in cross capacitance between the upper electrode 30 and the lower electrode 20 by the presence or absence of an indicator. The arrangement interval between the upper electrode 30 and the lower electrode 20 is a layout interval between the upper electrode 30 and the lower electrode 20 when viewed in a top view, namely, in a direction perpendicular to the touch screen. The black dots indicate a value "a" of the display panel in this embodiment in which the touch screen is integrated, and the white dots indicate a value "b" of the conventional display panel in which the touch screen is not integrated.

For the conventional touch screen, although the arrangement interval between the upper electrode 30 and the lower electrode 20 is shorter than the thickness of the color filter substrate 10, the amount of change in cross capacitance between the upper electrode 30 and the lower electrode 20 by the presence or absence of contact with the finger hardly changes. In other words, for the conventional touch screen, the arrangement interval between the upper electrode 30 and the lower electrode 20 does not need to be determined with consideration given to the detection sensitivity. The greater arrangement interval between the lower wire 20 and the upper wire 30 further increases an aperture ratio of the touch screen, and a high-intensity display panel can be obtained. Thus, the arrangement interval between the lower wire 20 and the upper wire 30 may be selected from the longest interval possible in the range of 0.1 mm to 1 mm as described above and in the range in which optical problems such as moiré do not occur.

In contrast, for the touch screen in this embodiment, when the arrangement interval between the upper electrode 30 and the lower electrode 20 is 1.15 times or smaller than the thickness of the color filter substrate 10, the amount of change in cross capacitance between the upper electrode 30 and the lower electrode 20 by the presence or absence of the finger significantly increases. Thus, for the touch-screen-integrated-display panel, when the arrangement interval between the upper electrode 30 and the lower electrode 20 is 1.15 times or smaller than the thickness of the color filter substrate 10, the decrease in the detection sensitivity can be prevented. It is more preferred that the arrangement interval between the upper electrode 30 and the lower electrode 20 is (one time or) less than the thickness of the color filter substrate 10, to thereby further improve the detection sensitivity. In this embodiment, a thickness of structural members each located between the upper electrode 30 and the LCD wiring and between the lower electrode 20 and the LCD wiring is less than or equal to $\frac{1}{100}$ the thickness of the color filter substrate 10. Thus, the thickness of the color filter substrate 10 described above is synonymous with the distance between the LCD wiring, and the upper wire 30 and the lower wire 20 of the touch screen.

Figure 9A:
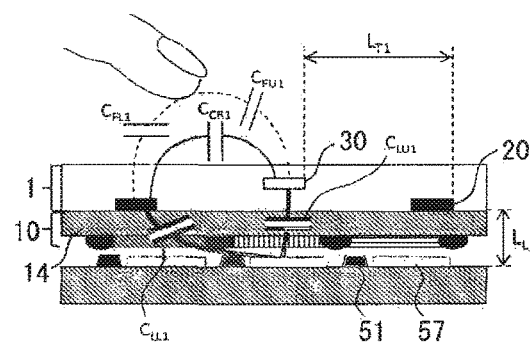
FIGS. 9A and 9B are schematic diagrams for describing effects of improving detection sensitivity of the touch screen portion according to the first embodiment.
Figure 9B:
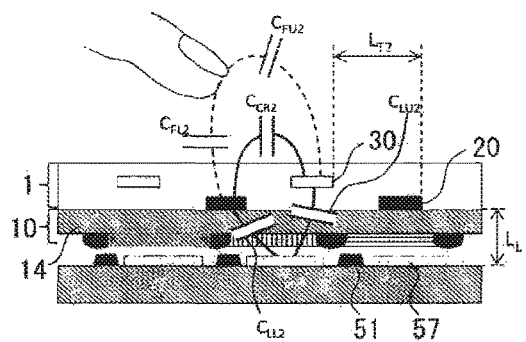

Next, effects of improving detection sensitivity obtained in this embodiment are described in detail with reference to the drawings. FIG. 9A is a schematic diagram showing a state of a capacitance formed in a case where an arrangement interval $L_{T1}$ between the upper electrode 30 and the lower electrode 20 in plan view is greater than a distance $L_L$ between the LCD wiring (such as the TFT array wiring 51 and the pixel electrode 57) and the touch screen portion 1. FIG. 9B is a schematic diagram showing a state of a capacitance formed in a case where an arrangement interval $L_{T2}$ between the upper electrode 30 and the lower electrode 20 in plan view is shorter than the distance $L_L$ between the LCD wiring and the touch screen portion 1. In the diagram, $C_{CR1}$, $C_{CR2}$ represent a cross capacitance, $C_{FL1}$, $C_{FL2}$ represent a capacitance formed between the indicator and the lower electrode 20, and $C_{FU1}$, $C_{FU2}$ represent a capacitance formed between the indicator and the upper electrode 30. $C_{LL1}$, $C_{LL2}$ represent a capacitance formed between the LCD wiring and the lower electrode 20, and $C_{LU1}$, $C_{LU2}$ represent a capacitance formed between the LCD wiring and the upper electrode 30.

As shown in FIG. 9A, in the case where the interval $L_{T1}$ between the upper electrode 30 and the lower electrode 20 is greater than the distance $L_L$ between the LCD wiring and the touch screen portion 1, the capacitances $C_{LL1}$, $C_{LU1}$ formed between the LCD wiring and the touch screen portion 1 increase, so that the cross capacitance $C_{CR1}$ formed between the upper electrode 30 and the lower electrode 20 decreases. The capacitances $C_{FL1}$, $C_{FU1}$ between the indicator, and the upper electrode 30 and the lower electrode 20 are formed of part of the cross capacitance $C_{CR1}$ formed between the upper electrode 30 and the lower electrode 20, so that the decrease in the cross capacitance $C_{CR1}$ decreases the capacitances $C_{FL1}$, $C_{FU1}$. In other words, the decrease in the cross capacitance $C_{CR1}$ also reduces the amount of change in capacitance of the upper electrode 30 and the lower electrode 20 by the contact with the finger.

On the other hand, as shown in FIG. 9B, in the case where the interval $L_{T2}$ between the upper electrode 30 and the lower electrode 20 is shorter than the distance $L_L$ between the LCD wiring and the touch screen portion 1, the capacitances $C_{LL2}$, $C_{LU2}$ formed between the LCD wiring and the touch screen portion 1 are lower than those in the case where the distance between the upper portion 30 and the lower portion 20 is greater than the distance $L_L$ between the LCD wiring and the touch screen portion 1. Thus, the cross capacitance $C_{CR2}$ formed between the upper electrode 30 and the lower electrode 20 increases. The capacitances $C_{FL2}$, $C_{FU2}$ between the indicator, and the upper electrode 30 and the lower electrode 20 are formed of part of the cross capacitance $C_{CR2}$ formed between the upper electrode 30 and the lower electrode 20, so that the increase in the cross capacitance $C_{CR2}$ increases the capacitances $C_{FL2}$, $C_{FU2}$. In other words, the increase in the cross capacitance $C_{CR2}$ also increases the amount of change in capacitance of the upper electrode 30 and the lower electrode 20 by the contact with the finger.

As described above, for the touch-screen-integrated-display panel, when the interval between the upper electrode and the lower electrode in plan view is 1.15 times or less than and is more preferably one time or less than the thickness of the color filter substrate, namely, the distance between the LCD wiring and the touch screen portion, the decrease in the detection sensitivity can be prevented.

Figure 10:
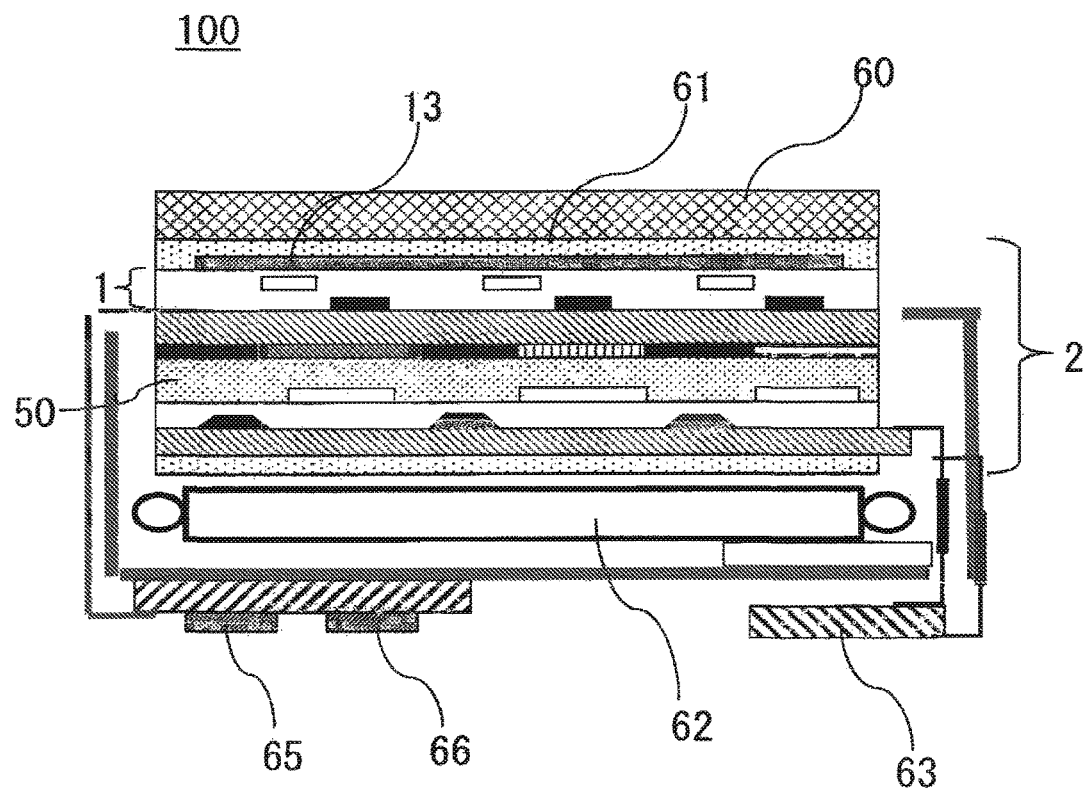
FIG. 10 is a cross-sectional view of a display apparatus according to the first embodiment.

FIG. 10 is a cross-sectional view showing a configuration of a display apparatus 100 including the touch-screen-integrated-display panel 2 in the first embodiment of the present invention.

As shown in the diagram, a backlight 62, a touch detection IC 65, a general-purpose microcontroller 66, a liquid crystal driving circuit substrate 63, or the like is mounted and assembled on the touch-screen-integrated-display panel 2 of the present invention, and thus the display apparatus 100 having the touch panel functions can be formed.

Figure 11:
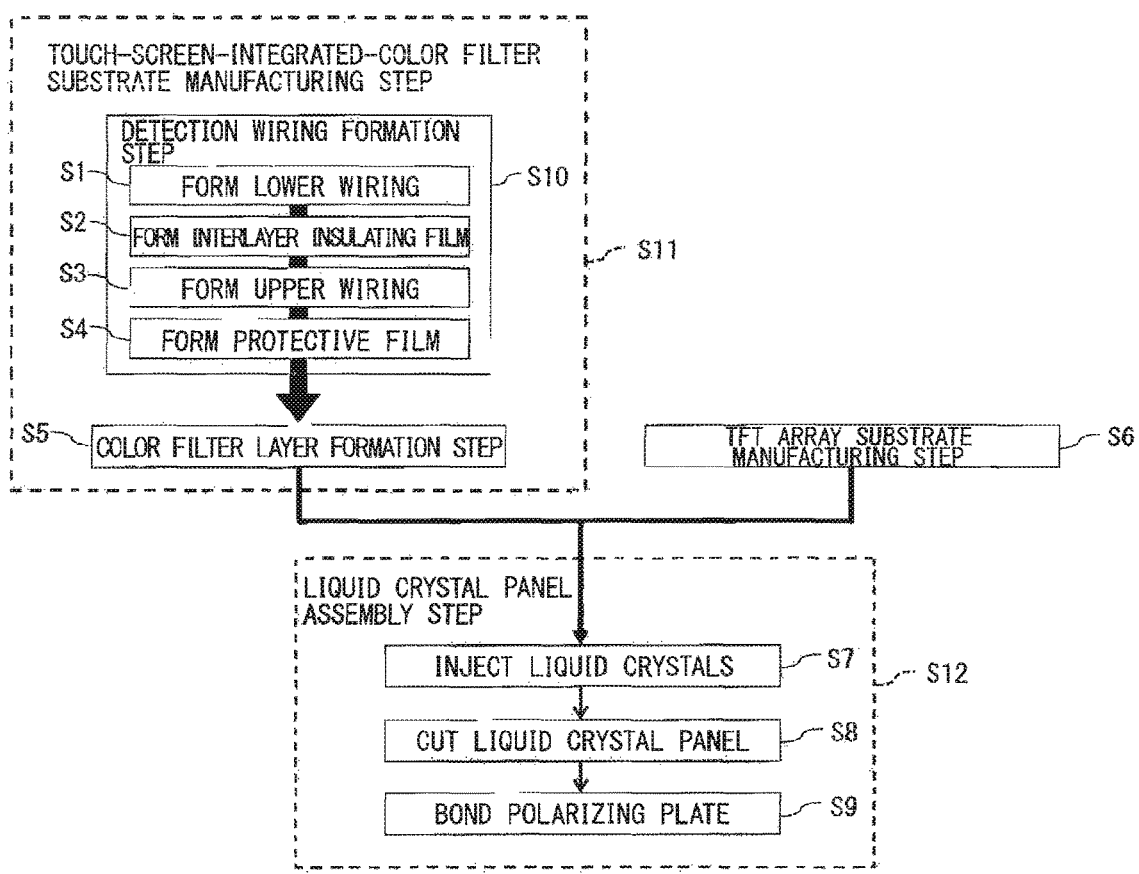
FIG. 11 is a flow chart showing steps of manufacturing a display panel according to the first embodiment.

Next, a method for manufacturing the touch-screen-integrated-display panel according to this embodiment is described. FIG. 11 is a flow chart showing an overview of an example of steps of manufacturing the display panel. FIGS. 12A to 12B, 13A, and 13B are schematic views showing an example of the steps of manufacturing the display panel.

As shown in FIG. 11, the steps of manufacturing the display panel can be classified into a step of manufacturing a touch-screen-integrated-color filter substrate (S11), a step of manufacturing a TFT array substrate (S6), and a step of assembling a liquid crystal panel (S12).

In the step of manufacturing a touch-screen-integrated-color filter substrate, first, a detection wiring formation step (S10) of forming the detection wires 21, 31 on the back surface of the transparent substrate 14 is performed. In this step, the lower wire 20 is formed on the back surface of the transparent substrate 14 (S1), the interlayer insulating film 11 is formed on the lower wire 10 (S2), the upper wire 30 is formed on the interlayer insulating film 11 (S3), and the protective film 12 is formed in the uppermost layer (S4). Subsequently, a color filter layer formation step (S5) of forming the color filter layer 76 on the front surface of the transparent substrate 14 is performed.

In the step of manufacturing a TFT array substrate, the switching elements including the TFT, the pixel electrode 57 connected to the TFT, the TFT array wiring 51 for supplying voltage to the TFT, and the TFT array terminal 56 for connecting the TFT array wiring 51 to the external circuit are formed on the surface of the transparent substrate 58 (S6).

In the step of assembling a liquid crystal panel, the liquid crystal layer 50 is injected in the portion between the color filter substrate 10 manufactured in the step of manufacturing a touch-screen-integrated-color filter substrate and the TFT array substrate 54 manufactured in the step of manufacturing a TFT array substrate, and the liquid crystal layer 50 is sealed with the sealing member 52 (S7). Subsequently, the transparent substrates 14, 58 that seal the liquid crystal layer 50 therebetween are appropriately cut (S8), and the polarizing plates 13, 53 are bonded as necessary (S9), to thereby complete the touch-screen-integrated-liquid crystal panel.

Next, with reference to FIGS. 12A to 12G, 13A, and 13B, the method for manufacturing a display panel according to the first embodiment is described in detail.

Figure 12A:
FIGS. 12A to 12G are schematic diagrams showing the steps of manufacturing a display panel according to the first embodiment.
Figure 12B:
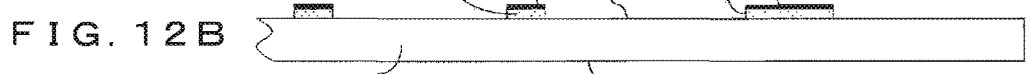

First, as shown in FIGS. 12A and 12B, an alloy of aluminum or the like is deposited on the surface of the transparent substrate 14 such as glass by sputtering or the like. Subsequently, a resist is applied, and the lower wire 20 (row-direction wire 21) and the row-direction wiring terminal 80 are formed by a photolithography process that performs exposure with a mask pattern, development, and etching. In the following description, a surface of the transparent substrate 14 on which the lower wire 20 is formed is referred to as a touch screen formation surface 401, and a surface opposite to the touch screen formation surface 401 is referred to as a color filter layer formation surface 402.

Figure 12C:

Next, as shown in FIG. 12C, a silicon oxide film or the like to be the interlayer insulating film 11 is formed on the touch screen formation surface 401 of the transparent substrate 14 by a plasma CVD device or the like. At this time, only the lower wire 20 and the row-direction wiring terminal 80 formed of the metal wiring are formed on the transparent substrate 14. The lower wire 20 and the row-direction wiring terminal 80 are not affected by heating or hydrogen plasma by plasma chemical vapor deposition (CVD). Thus, conditions for forming a film can be freely selected, and the sufficient interlayer insulating film having excellent withstanding pressure, chemical resistance, and hardness can be formed.

Figure 12D:
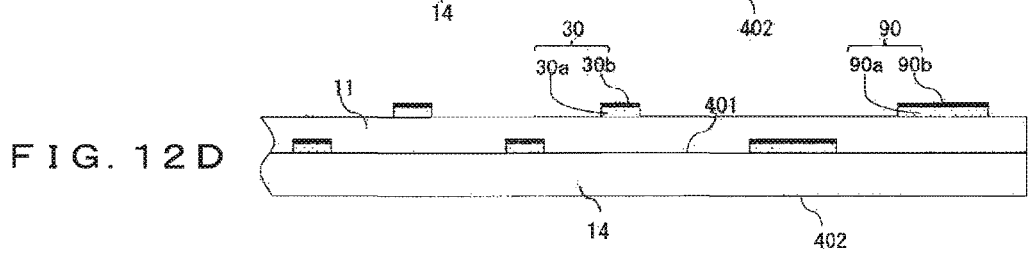

Next, as shown in FIG. 12D, an alloy of aluminum is deposited by sputtering, and the upper wire 30 (column-direction wire 31) and the column-direction wiring terminal 90 are formed by the photolithography process described above.

Figure 12E:
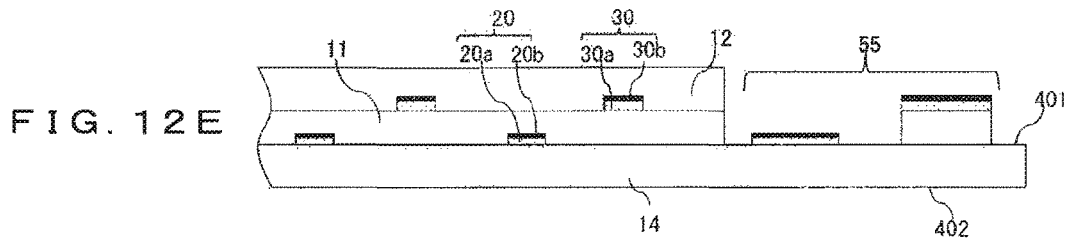

Then, as shown in FIG. 12E, a silicon oxide film or the like to be the protective film 12 is formed by the plasma CVD device or the like so as to cover the lower wire 20, the row-direction wiring terminal 80, the upper wire 30, the column-direction wiring terminal 90, and the interlayer insulating film 11. At this time, the lower wire 20 and the upper wire 30 formed of the metal wiring and the interlayer insulating film 11 made of the silicon oxide film or the like, which are formed on the transparent substrate 14, are not affected by heating or hydrogen plasma by the plasma CVD. Thus, the sufficient protective film 12 having excellent withstanding pressure, chemical resistance, and hardness can be formed.

Finally, the interlayer insulating film 11 and the protective film 12 around the row-direction wiring terminal 80 and the column-direction wiring terminal 90, which form the touch screen terminal portion 8, are removed by the photolithography process and dry etching. This causes the upper surfaces and the side surfaces of the row-direction wiring terminal 80 and the column-direction wiring terminal 90 to be exposed, and thus the row-direction wiring terminal 80 and the column-direction wiring terminal 90 can be connected to an external control IC. The touch screen portion 1 is completed in the steps described above.

Figure 12F:
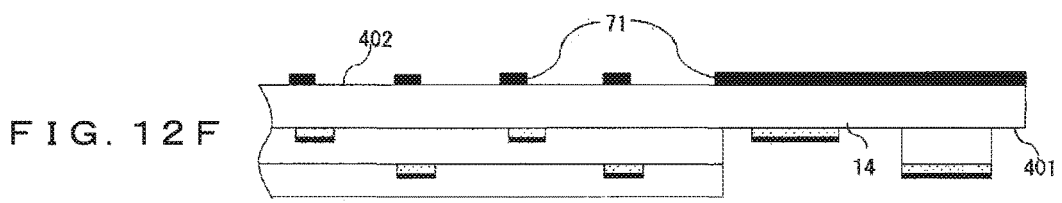
Figure 12G:
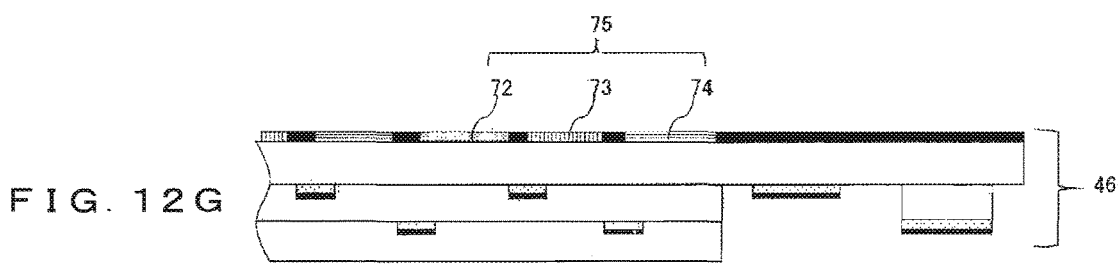

Next, as shown in FIGS. 12F and 12G, the black matrix 71 and the color material layer 75 to be the color filter layer 76 of the liquid crystal panel are formed on the surface 402 opposite to the surface 401 on which the touch screen portion 1 of the transparent substrate 14 is formed. Each layer of the Red layer 72, the Green layer 73, and the Blue layer 74, which form the color material layer 75, and the black matrix 71 are both formed by the photolithography process.

Figure 13A:
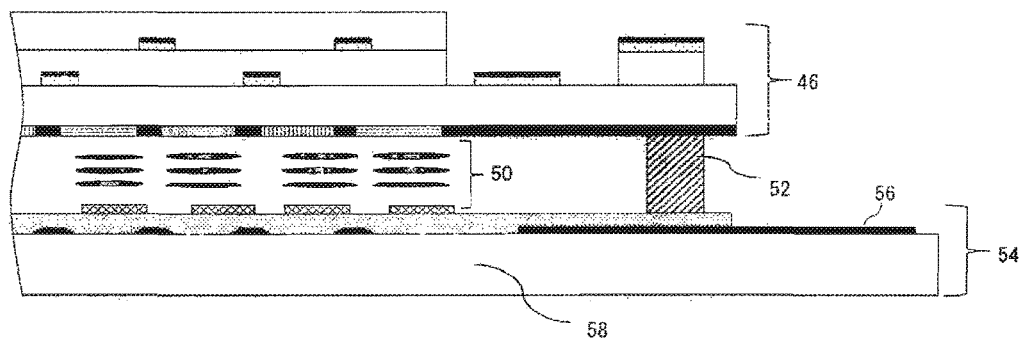
FIGS. 13A and 13B are schematic diagrams showing the steps of manufacturing a display panel according to the first embodiment.

Subsequently, as shown in FIG. 13A, the surface of the transparent substrate 14, namely, the surface on which the color filter layer 76 is formed, is located so as to face the surface on which the TFT of the TFT array substrate 54 manufactured in the other step is formed. The sealing member 52 is formed between the surface on which the color filter layer 76 is formed and the surface on which the TFT of the TFT array substrate 54 is formed, and the liquid crystal layer 50 is injected in the portion therebetween.

Figure 13B:
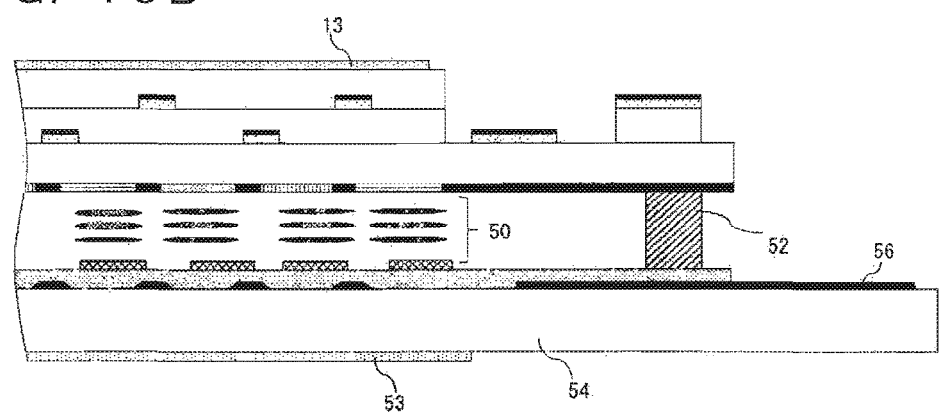

Further, as shown in FIG. 13B, the upper polarizing plate 13 is bonded to the protective film 12 of the touch screen portion 1, and the lower polarizing plate 53 is bonded to the back surface of the TFT array substrate 54. The touch-screen-integrated-liquid crystal panel 2 is completed in the steps described above.

An alkalescent solution is typically used for etching the color filter layer 76. The upper layer of the touch screen terminals 55 (the row-direction wiring terminal 80, the column-direction wiring terminal 90) is preferably covered with a material having chemical resistance to prevent the damage in the step of etching the color filter layer 76. Thus, the reflection reducing layers 80b, 90b of the touch screen terminals 55 are also formed in the step of forming the reflection reducing layers 20b, 30b of the lower wire 20 and the upper wire 30 of the detection wires 21, 31, so that one manufacturing step including the steps of forming a film, performing a photolithography process, and performing etching can be simplified.

In the step of manufacturing the color filter layer 76, each step is performed while the surface 401 of the transparent substrate 14 on which the touch screen portion 1 is formed faces the back side. Thus, the touch screen portion 1 contacts the stage of the processing device and the surface of the substrate transportation equipment, easily causing scratches and soil. However, the touch screen is formed on the single transparent substrate 14 such as glass before the color filter layer 76 is formed in the touch-screen-integrated-display panel 2 in this embodiment, so that the interlayer insulating film 11 and the protective film 12 of higher quality can be formed with few limitations on temperature, devices, or the like in the step of manufacturing the touch screen. Particularly, the detection wires 21, 31 are made of a chemically stable metal wiring material, so that the interlayer insulating film 11 and the protective film 12 having excellent water resistance and chemical resistance can be formed without the limitations on the process and temperature for forming the interlayer insulating film 11 and the protective film 12. As a result, the touch screen portion 1 having sufficient film hardness and chemical resistance is not thus easily affected by the damage due to the scratches and the chemical solution in the step of manufacturing the color filter layer 76.

Furthermore, the material for forming the color filter layer 76 disassembles and fades by high temperature treatment, so that the color filter substrate 10 cannot be treated at high temperature after the color filter layer 76 is formed. For this reason, by forming the touch screen portion 1 before the color filter layer 76 is formed as in this embodiment, the interlayer insulating film 11 and the protective film 12 having high hardness can be formed by processes of forming and treating a film at high temperature without the limitations on the processes and temperature. In other words, the interlayer insulating film 11 and the protective film 12 that need the high temperature treatment to have the high hardness are achieved by forming the touch screen portion 1 before forming the color filter layer 76. As a result, the interlayer insulating film 11 and the protective film 12 having approximately the same hardness as that of dust or glass suspended in the air, and more specifically, the hardness of greater than or equal to 7, can be formed. This improves the anti-scratch property in the step of forming the touch-screen-integrated-color filter substrate 10.

In a typical case where the touch-screen-integrated-liquid crystal panel is formed by using the color filter substrate 10 after the color filter layer 76 has been formed, first, the color filter substrate 10 and the TFT array substrate 54 are bonded together, and the touch screen portion 1 is fainted after the liquid crystals are injected and sealed in the portion between the substrates. Thus, at the occurrence of a defect in the touch screen, the defect occurs at the stage of the completion of the liquid crystal panel, thereby causing a great loss of costs. On the other hand, for the manufacturing method of the present invention, at the occurrence of a defect in the touch screen, the defect occurs in only the color filter substrate, which results in a small loss of costs and also the advantage of environmental conservation.

As described above, the display panel in this embodiment includes: the display functional portion formed of the display functional layer sandwiched between the two transparent substrates located to face each other; and the touch screen portion that includes the lower wire and the upper wire made of the conductive metal material, that includes the interlayer insulating film located between the lower wire and the upper wire, and that includes the protective film covering the lower wire, the upper wire, and the interlayer insulating film. The lower wire of the touch screen portion is located on the surface on the observer side of the transparent substrate located on the observer side. Thus, the transparent substrate forming the touch screen portion also serves as the transparent substrate forming the display functional portion, so that the whole apparatus can be reduced in weight. In other words, in this embodiment, the touch screen portion is formed on the upper substrate of the display functional portion to be integrated with the display functional portion, and thus the reduction in the thickness and weight of the display panel can be achieved. The lower wire and the upper wire are located on the surface on the observer side of the transparent substrate on the observer side, so that the color filter substrate is not located between the indicator such as the finger and the wires for detecting the touch position, thereby improving the detection sensitivity. Furthermore, the lower wire and the upper wire are made of the conductive metal material, which is not affected by heating or hydrogen plasma, and thus the interlayer insulating film and the protective film having the excellent withstanding pressure, chemical resistance, and hardness can be formed.

Therefore, the display panel that can be reduced in the thickness and weight and has the touch screen functions integrated therein can achieve both of the high detection sensitivity and the high environmental resistance.

Since the processes and temperature are not limited in the step of forming the touch screen portion 1, the insulating film having the high transmittance can be formed. As a result, the yellowish display screen and the decrease in transmittance can be suppressed.

In the display panel 2 in this embodiment, the lower wire 20 and the upper wire 30 of the detection wires 21, 31 include wires that are located at the 45° angle in the slanting direction or have the curved portions located such that the normal lines thereof face all directions, and the upper polarizing plate 13 of the display panel 2 on which the antiglare treatment is performed is bonded onto the protective film 12 of the touch screen portion 1. Thus, display unevenness such as moiré does not occur, and for the outdoor use, intense reflected light in a specific direction occurring under illumination of intense spot light of external light is hardly visually identified.

Furthermore, the touch screen portion 1 of the display panel 2 in this embodiment includes the detection wires 21, 31 formed of the metal wiring having a low resistance, so that the detection wires 21, 31 have a small time constant, and the touch panel functions allowing for fast touch detection with a short response time can be achieved.

The detection wires 21, 31 in the display panel 2 in this embodiment made of metal, which have no absorption on a short-wave wavelength side, do not cause a decrease in display performance of the display panel, in contrast to detection wires made of a transparent electrode substance, which have an absorption on a short-wave wavelength side.

Moreover, the detection wires 21, 31 of the display panel 2 in this embodiment are made of metal, so that the detection wires 21, 31 have an equal reflectance of external light regardless of whether it is at the intersection portion of the detection wires or not. This does not cause the decrease in display performance, unlike the case where the detection wires made of an opaque electrode material have the different reflectance at the intersection portion and the other portion, causing the intersection portion to be easily visually identified.

The plurality of row-direction wires 21 is faulted of the predetermined number of the plurality of lower wires 20 that are electrically connected to each other while the plurality of column-direction wires 31 is formed of the predetermined number of the plurality of upper wires 30 that are electrically connected to each other. This can suppress the influences of breaks in the lower wires 20 and the upper wires 30. Further, the lower wires 20 and the upper wires 30 have a gap therebetween, which can suppress a decrease in luminance of the display of an image and an illustration.

In the display apparatus 100 of the present invention, the transparent substrate on which the detection wiring is formed also serves as the transparent substrate for the color filter substrate, and thus the thin and light display apparatus can be achieved. The touch screen portion 1 is located directly below the upper polarizing plate 13, and thus the display apparatus having high detection sensitivity of a touch position can be achieved. Further, a protective transparent substrate 60 is bonded to the surface of the display panel 2 with a bonding layer 61, and thus the display apparatus having high environmental resistance can be achieved. The touch screen portion 1 is integrated in the surface of the display panel 2, the touch screen portion 1 being formed of the detection wires 21, 31 of the chemically stable metal wiring material and the inorganic interlayer insulating film 11 having high hardness of greater than or equal to 7, excellent water resistance, and excellent chemical resistance. This eliminates the need for an external touch screen substrate. Thus, the thin and light display apparatus that has small variations in the touch detection sensitivity caused by corrosion and disconnection of wiring and moisture absorption even in the hostile environment such as the outside, that has the excellent environmental resistance, and that has the touch panel functions can be achieved.

In summary, the touch-screen-integrated-display panel of the present invention and the display apparatus including the touch-screen-integrated-display panel can achieve a display panel and a display apparatus that are thin and light, that have excellent environmental resistance, excellent detection speed of a touch position, excellent detection accuracy of a touch position, excellent display quality of an image, and excellent visibility under illumination of external light, and that can be increased in size.

Second Embodiment

Figure 14:
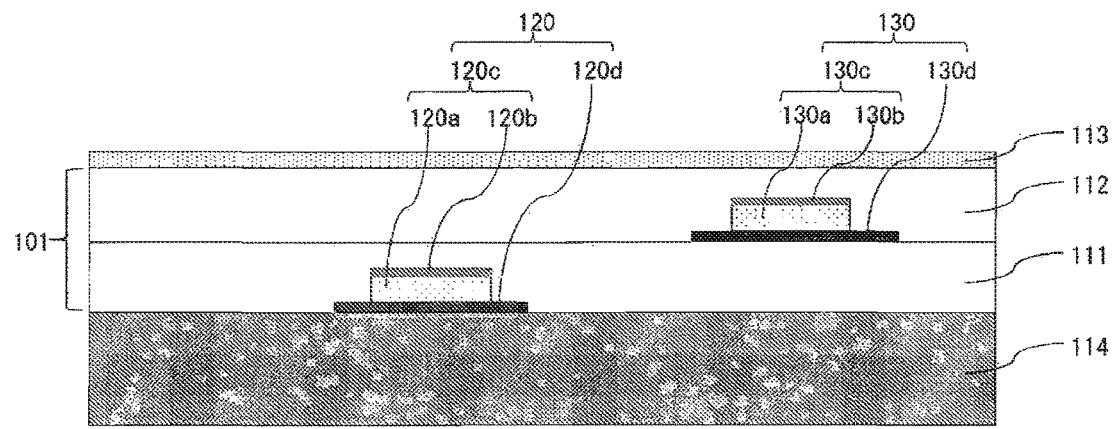
FIG. 14 is a cross-sectional view of a touch screen portion according to a second embodiment.

FIG. 14 is a cross-sectional view of detection wiring of a touch screen portion in a touch-screen-integrated-display panel according to a second embodiment. In comparison with the detection wiring in the first embodiment, a lower wire and an upper wire that form detection wiring have films of a different shape in a lowermost layer. The configuration of the first embodiment except for the lower wire and the upper wire is common to the configuration of this embodiment, and the configuration peculiar to this embodiment will be mainly described below.

As shown in FIG. 14, a touch screen portion 101 includes a lower wire 120 located on a transparent substrate 114, an upper wire 130, an interlayer insulating film 111 that is located between the lower wire 120 and the upper wire 130 and is made of silicon oxide or the like, and a protective film 112 formed on the upper wire 130. The lower wire 120 is formed of a lower layer film 120d and an upper layer film 120c located on the lower layer film 120d, and the upper wire 130 is formed of a lower layer film 130d and an upper layer film 130c located on the lower layer film 130d.

The upper layer film 120c is formed of a wiring layer 120a and a reflection reducing layer 120b located on an upper surface of the wiring layer 120a, and the upper layer film 130c is formed of a wiring layer 130a and a reflection reducing layer 130b located on an upper surface of the wiring layer 130a. The upper layer films 120c, 130c each have a multilayer structure including an aluminum-based alloy layer and a nitrided aluminum-based alloy layer, similarly to the wiring layers 20a, 30a and the reflection reducing layers 20b, 30b of the lower wire 20 and the upper wire 30 in the first embodiment. The upper layer films 120c, 130c have a thickness of approximately 100 to 500 nm. The reflection reducing layers 120b, 130b in the uppermost layer of the upper layer films 120c, 130c may be made of a transparent conductive film such as aluminum nitride, a thin film of ITO, and indium tin oxide (InZnO).

The lower layer films 120d, 130d are made of molybdenum, chromium, tantalum, or the like, and are made of a material having etching selectivity to the upper layer films 120c, 130c of aluminum alloy or the like. The lower layer films 120d, 130d have a thickness of less than or equal to 50 nm and thinner than a thickness of the upper layer films 120c, 130c. Herein, the thickness of the upper layer films 120c, 130c represents a combination of the thickness of the wiring layers 120a, 130a and the thickness of the reflection reducing layers 120b, 130b.

The lower layer films 120d, 130d protrude from the end portions of the upper layer films 120c, 130c to a distance of greater than or equal to the film thickness of the upper layer films 120c, 130c in the horizontal direction. In other words, when viewed in a plan view of the display panel, namely, in the direction of the normal to the surface of the display panel, the peripheral portions of the lower layer films 120d, 130d are formed so as to be located outside the peripheral portions of the upper layer films 120c, 130c at the distance of greater than or equal to the film thickness of the upper layer films 120c, 130c.

Figure 15A:
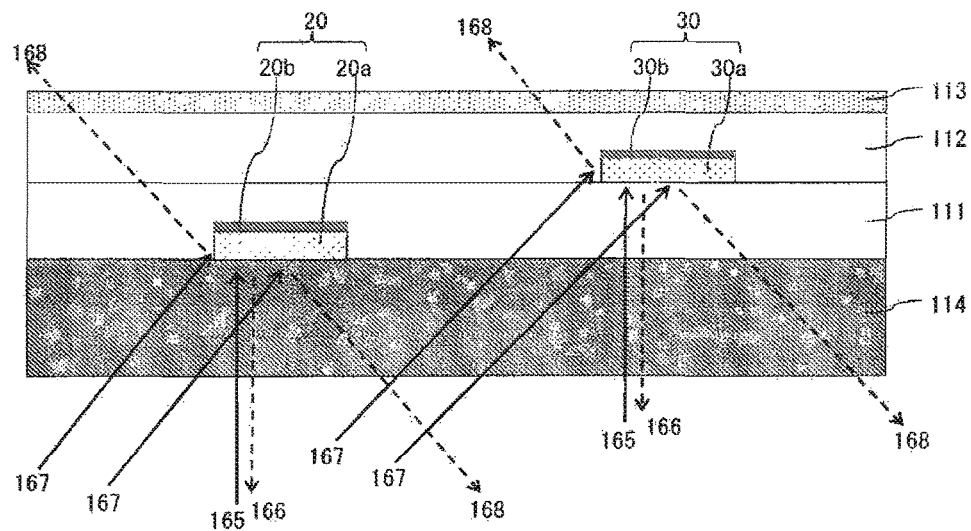
FIGS. 15A and 15B are cross-sectional views for describing effects of the touch screen portion according to the second embodiment.
Figure 15B:
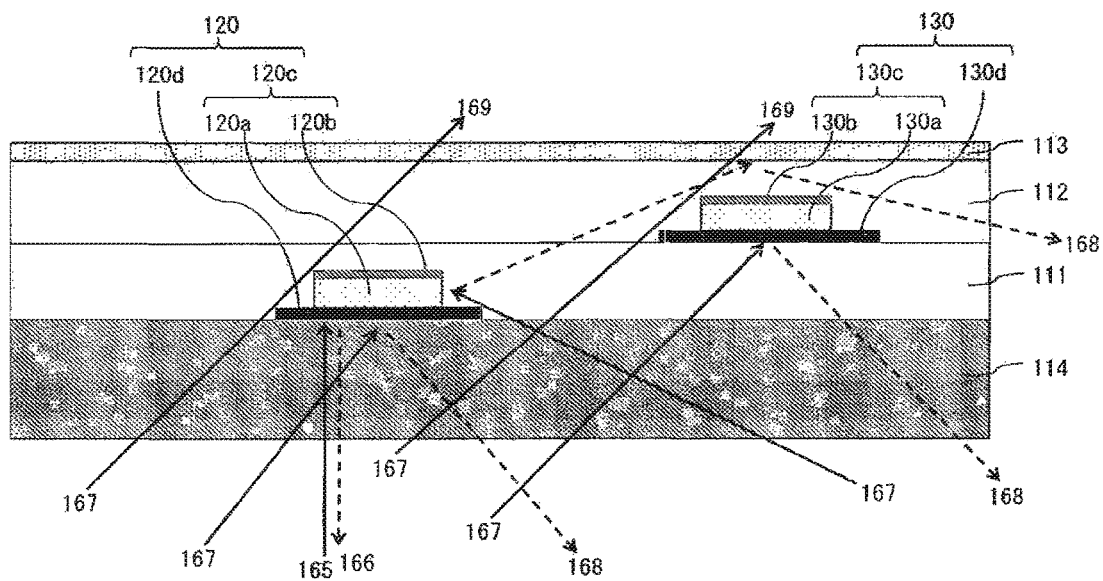

Next, with reference to FIGS. 15A and 15B, effects obtained from this embodiment are described. FIG. 15A is a schematic view showing the structure of the detection wiring according to the first embodiment and a state of reflection of incident light. FIG. 15B is a schematic view showing the structure of the detection wiring according to this embodiment and a state of reflection of incident light.

In a case where the touch screen portion 101 is formed in the surface of the color filter substrate as for the display panel of the present invention, an upper polarizing plate 113 is located on the surface of the touch screen portion 101 (on the observer side). As shown in FIG. 15A, part of light that is emitted from the backlight located on the back side of the display panel through the lower polarizing plate and the liquid crystal layer is reflected by the back surfaces of the lower wire 20 and the upper wire 30. At this time, an incident light 165 in a vertical direction, which becomes a reflected light 166 reflected back to the backlight side, does not affect the display performance of the display panel. However, an incident light 167 in a slanting direction is reflected by the side surfaces of the lower wire 20 and the upper wire 30 to be a reflected light 168 reaching the upper polarizing plate 113 on the surface of the touch screen. Since the polarization of the reflected light 168 is disturbed by reflection on the metal surfaces of the lower wire 20 and the upper wire 30, the reflected light 168 passes through the upper polarizing plate 113 and reaches the observer even when a black state is displayed. This causes a decrease in contrast and a change in voltage-luminance characteristics.

On the other hand, as shown in this embodiment, the lower layer films 120d, 130d are formed to be greater than the upper layer films 120c, 130c by greater than or equal to the thickness of the upper layer films 120, 130c, so that the reflected light 168, which is reflected by the side surfaces of the lower wire 120 and the upper wire 130, of the incident light 167 in the slanting direction can be reduced. As a result, as shown in FIG. 15B, only the incident light 167 at the lower angle is reflected by the side surfaces of the lower wire 120 and the upper wire 130. Thus, even if the incident light 167 is reflected, its reflected light 168 is totally reflected by an interface between the protective film 112 and the upper polarizing plate 113 and remains in the display panel without reaching the observer. Particularly for the liquid crystal panel, sufficient effects can be obtained at approximately 45° in consideration of an angle distribution of the emitted light from the backlight, and thus it suffices that the amount of protrusion of the lower layer films 120d, 130d is greater than or equal to the film thickness of the upper layer films 120c, 130c.

Figure 16:
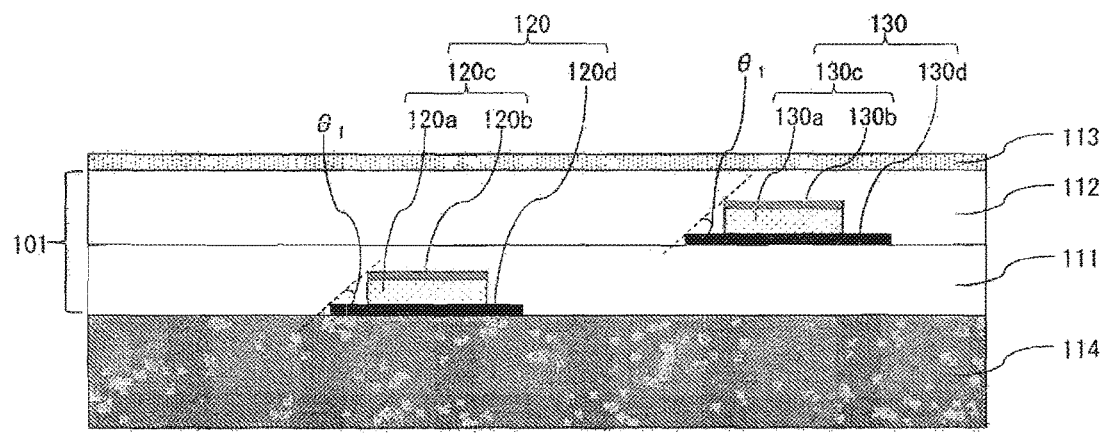
FIG. 16 is a cross-sectional view of the touch screen portion according to the second embodiment.

More specifically, as shown in FIG. 16, an angle between a line connecting the end portions of the upper layer films 120c, 130c to the end portions of the lower layer films 120d, 130d and the upper surface of the transparent substrate 114 is assumed to be $\theta_1$, and the maximum effect can be obtained when $(90°-\theta_1)$ is a value greater than a maximum angle of light emitted from the backlight. It should be noted that most of the reflection of the light emitted from the backlight can be reduced even in a case where $(90°-\theta_1)$ is smaller than the maximum angle of the backlight, for example, approximately 45°.

Third Embodiment

A third embodiment gives description of another wiring configuration from which, similar to the second embodiment, effects of preventing a decrease in contrast and a change in voltage-luminance characteristics are obtained.

Figure 17:
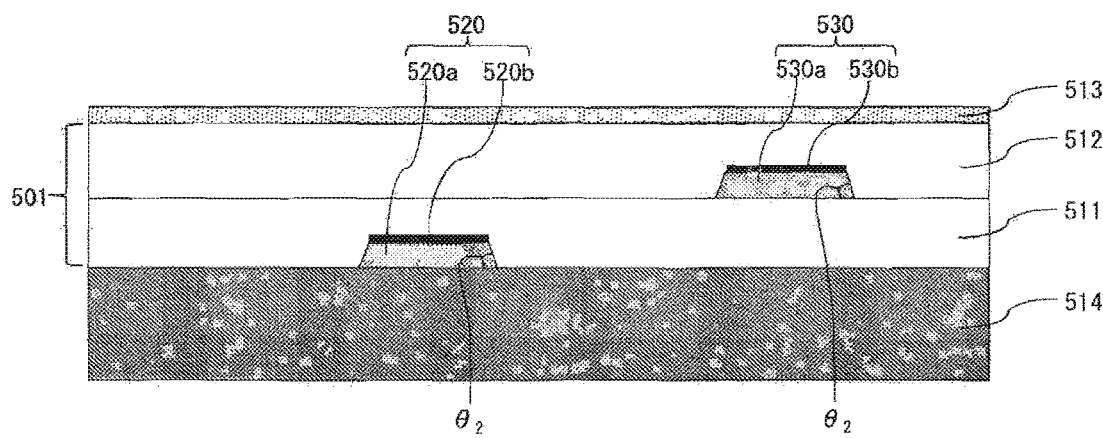
FIG. 17 is a cross-sectional view of a touch screen portion according to a third embodiment.

FIG. 17 is a cross-sectional view of detection wiring of a touch screen portion in a touch-screen-integrated-display panel according to the third embodiment. In comparison with the first embodiment, a lower wire and an upper wire that form the detection wiring have a lowermost layer in a different cross-sectional shape in the third embodiment. The configuration of the first embodiment except for the lower wire and the upper wire is common to the configuration of this embodiment, and the configuration peculiar to this embodiment will be mainly described.

A lower wire 520 forming the detection wiring is formed of a wiring layer 520a located on a transparent substrate 514 and a reflection reducing layer 520b located on an upper surface of the wiring layer 520a, and an upper wire 530 forming the detection wiring is formed of a wiring layer 530a located above the transparent substrate 514 and a reflection reducing layer 530b located on an upper surface of the wiring layer 530a. The sections of the wiring layers 520a, 530a have a forward tapered shape (trapezoidal shape) having a width that is extended in the horizontal direction by greater than or equal to the film thickness of the wiring layers 520a, 530a from upper end portions of the wiring layers 520a, 530a (on the reflection reducing layers 520b, 530b side) toward lower end portions thereof (on the transparent substrate 514 side). This embodiment can have the same effects as those in the second embodiment.

In this embodiment, an angle (taper angle) of an inclined surface of the wiring layers 520a, 530a, namely, an angle between the side surfaces of the wiring layers 520a, 530a and the upper surface of the transparent substrate 514 is assumed to be $\theta_2$, and $(90°-\theta_2)$ is set to be a value greater than a maximum angle of light emitted from the backlight. This eliminates the incident light reflected by the side surfaces of the wiring layers 520a, 530a, and thus the maximum effects can be obtained. It should be noted that most of the reflection of the light emitted from the backlight can be reduced even in a case where $(90°-\theta_2)$ is smaller than the maximum angle of the backlight, for example, approximately 45°. Thus, the sufficient effects can be obtained when $\theta_2$ is less than or equal to approximately 45°.

Fourth Embodiment

A fourth embodiment gives description of another wiring configuration from which, similar to the second embodiment, effects of preventing a decrease in contrast and a change in voltage-luminance characteristics are obtained.

Figure 18:
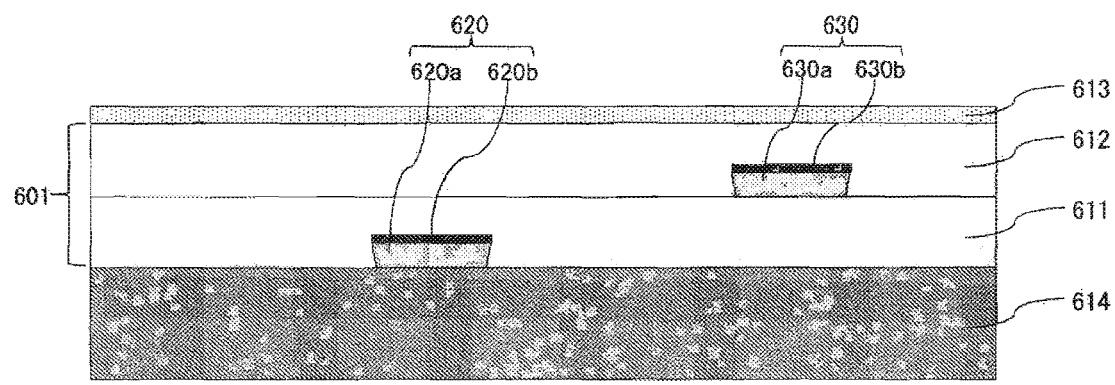
FIG. 18 is a cross-sectional view of a touch screen portion according to a fourth embodiment.

FIG. 18 is a cross-sectional view of detection wiring of a touch screen portion in a touch-screen-integrated-display panel according to the fourth embodiment. In comparison with the first embodiment, a lower wire and an upper wire that form the detection wiring have a lowermost layer in a different cross-sectional shape in the fourth embodiment. The configuration of the first embodiment except for the lower wire and the upper wire is common to the configuration of this embodiment, and the configuration peculiar to this embodiment will be mainly described.

A lower wire 620 forming the detection wiring is formed of a wiring layer 620a located on a transparent substrate 614 and a reflection reducing layer 620b located on an upper surface of the wiring layer 620a, and an upper wire 630 forming the detection wiring is formed of a wiring layer 630a located above the transparent substrate 614 and a reflection reducing layer 630b located on an upper surface of the wiring layer 630a. The sections of the wiring layers 620a, 630a have an inverse tapered shape having a width that is narrowed in the horizontal direction by greater than or equal to the film thickness of the wiring layers 620a, 630a from upper end portions of the wiring layers 620a, 630a (on the reflection reducing layers 620b, 630b side) toward lower end portions thereof (on the transparent substrate 614 side). In other words, the upper end portions of the side surfaces of the wiring layers 620a, 630a protrude outward more than the lower end portions thereof.

Figure 19:
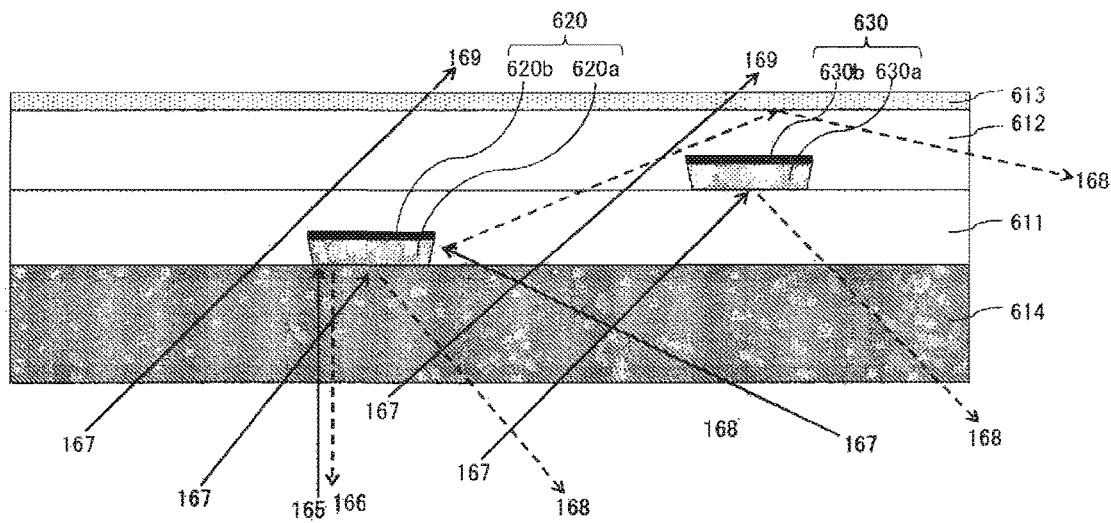
FIG. 19 is a cross-sectional view for describing effects of the touch screen portion according to the fourth embodiment.
Figure 20:
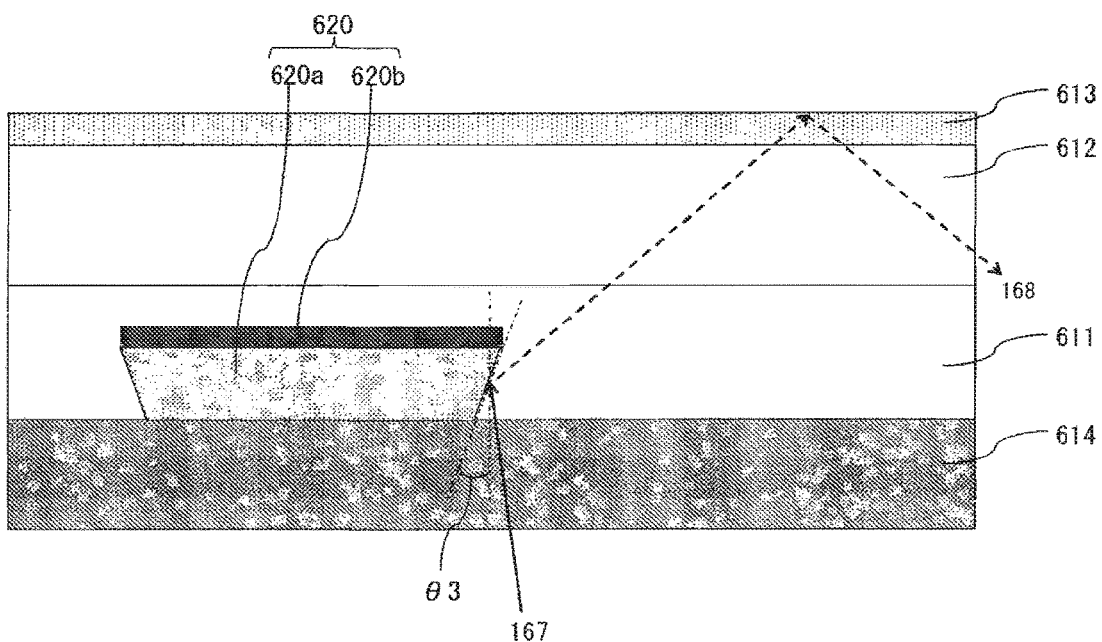
FIG. 20 is a cross-sectional view for describing effects of the touch screen portion according to the fourth embodiment.

Next, effects obtained from this embodiment are described. FIG. 19 is a schematic view showing the structure of the detection wiring according to this embodiment and a state of reflection of incident light. FIG. 20 is a schematic view showing a state of reflection of light having a small scattering angle.

As shown in FIG. 19, in this embodiment, the lower end portions of the wiring layers 620a, 630a are formed so as to have the width smaller than the width of the upper end portions of the wiring layers 620a, 630a, which allows for a low angle of the reflected light 168 reaching an upper polarizing plate 613. In other words, the reflected light 168, which is reflected by the side surfaces of the lower wire 620 and the upper wire 630, of the incident light 167 in the slanting direction is reflected by the upper polarizing plate 613 toward the side opposite to the observer. As a result, the reflected light 168 reaching the observer can be reduced.

On the other hand, of light emitted from the backlight, the light which has a small scattering angle may be reflected at an angle to reach the observer. As shown in FIG. 20, in a case where an angle between the inclined surface of the wiring layer 620a and a line perpendicular to the touch screen is $\theta_3$, the reflected light 168 is reflected by the side surfaces of the lower wire 620 and the upper wire 630 at an angle ($2\theta_3$) twice as wide as $\theta_3$ compared to the case where the side surface of the wiring layer is perpendicular, and the reflected light 168 travels toward the upper polarizing plate 613. At this time, $\theta_3$ is set such that an incident angle on the interface between the upper polarizing plate 613 and the air is greater than or equal to a critical angle, thereby preventing the reflected light 168 from reaching the observer.

Fifth Embodiment

A fifth embodiment gives description of another wiring configuration from which, similar to the fourth embodiment, effects of preventing a decrease in contrast and a change in voltage-luminance characteristics are obtained.

Figure 21:
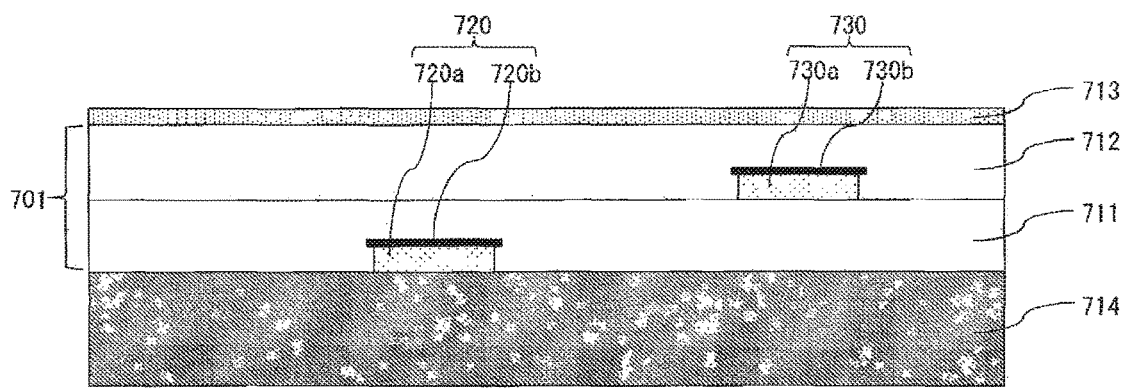
FIG. 21 is a cross-sectional view of a touch screen portion according to a fifth embodiment.

FIG. 21 is a cross-sectional view of detection wiring of a touch screen portion in a touch-screen-integrated-display panel according to a fifth embodiment, in comparison with the first embodiment, a lower wire and an upper wire that form the detection wiring have different cross-sectional shapes in the fifth embodiment. The configuration of the first embodiment except for the lower wire and the upper wire is common to the configuration of this embodiment, and the configuration peculiar to this embodiment will be mainly described.

A lower wire 720 forming the detection wiring is formed of a wiring layer 720a located on a transparent substrate 714 and a reflection reducing layer 720b located on an upper surface of the wiring layer 720a, and an upper wire 730 forming the detection wiring is formed of a wiring layer 730a located above the transparent substrate 714 and a reflection reducing layer 730b located on an upper surface of the wiring layer 730a. The lower wire 720 and the upper wire 730 have a shape of eaves such that end portions in the width direction of the reflection reducing layers 720b, 730b each protrude from the end portions in the width direction of the wiring layers 720a, 730a to a distance of greater than or equal to the film thickness of the wiring layers 720a, 730a in the horizontal direction. In other words, when viewed in a plan view of the display panel, the peripheral portions of the reflection reducing layers 720b, 730b are fainted so as to be located outside the peripheral portions of the wiring layers 720a, 730a at the distance of greater than or equal to the film thickness of the wiring layers 720a, 730a. Thus, the reflected light, which is reflected by the side surfaces of the lower wire 720 and the upper wire 730 and travels toward the upper polarizing plate 713, is reflected by the back surfaces of the reflection reducing layers 720b, 730b that protrude in the shape of the eaves. This can reduce the reflected light 168 that reaches the observer.

Sixth Embodiment

Figure 22:
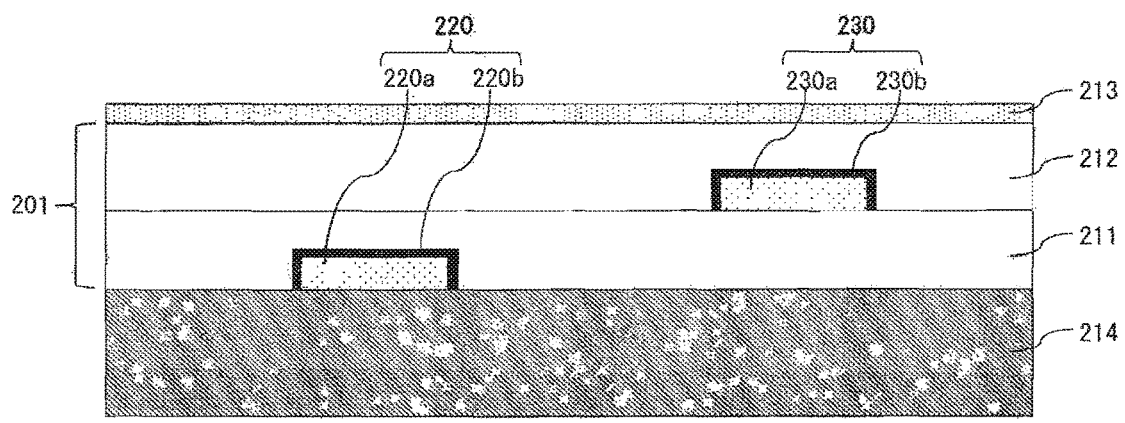
FIG. 22 is a cross-sectional view of a touch screen portion according to a sixth embodiment.

FIG. 22 is a cross-sectional view of detection wiring of a touch screen portion in a touch-screen-integrated-display panel according to a sixth embodiment. In comparison with the detection wiring of the first embodiment, a lower wire and an upper wire that form the detection wiring have reflection reducing layers in a different shape. The configuration of the first embodiment except for the lower wire and the upper wire is common to the configuration of this embodiment, and the configuration peculiar to this embodiment will be mainly described.

As shown in FIG. 22, a touch screen portion 201 includes a lower wire 220 that is located above a transparent substrate 214, an upper wire 230, an interlayer insulating film 211 that is located between the lower wire 220 and the upper wire 230 and is made of a silicon oxide film or the like, and a protective film 212 formed on the upper wire 230. The lower wire 220 is formed of a wiring layer 220a and a reflection reducing layer 220b, and the upper wire 230 is formed of a wiring layer 230a and a reflection reducing layer 230b. In this embodiment, the reflection reducing layers 220b, 230b cover not only the upper surfaces of the wiring layers 220a, 230a but also the side surfaces thereof.

Next, a method for manufacturing the lower wire 220 and the upper wire 230 in this embodiment is described. The lower wire 220 and the upper wire 230 are made of silver, silver alloy material, copper, copper alloy material, aluminum, or aluminum alloy material. Then, when the lower wire 220 and the upper wire 230 are made of for example, silver, blackening for forming silver chloride or silver chloride and silver sulfide on the surface of silver by chemical treatment is applied. When the lower wire 220 and the upper wire 230 are made of copper, blackening for forming copper sulfide or copper oxide on the surface of copper by chemical treatment is applied. Further, when the lower wire 220 and the upper wire 230 are made of aluminum, aluminum nitride layer is formed on the surface of aluminum by nitrogen plasma treatment. The reflection reducing layers 220b, 230b covering the surfaces of the wiring layers 220a, 230a are formed by the treatment.

As described above, in this embodiment, the upper surfaces and the side surfaces of the wiring layers 220a, 230a are covered with the reflection reducing layers 220b, 230b. Thus, external light incident from an upper polarizing plate 213 from above and reflection on the side surfaces of the lower wire 220 and the upper wire 230 caused by an oblique direction component of backlight light can be suppressed. As a result, the touch-screen-integrated-display panel that has high contrast, low reflection under external light, and excellent display quality can be achieved.

Seventh Embodiment

Figure 23A:
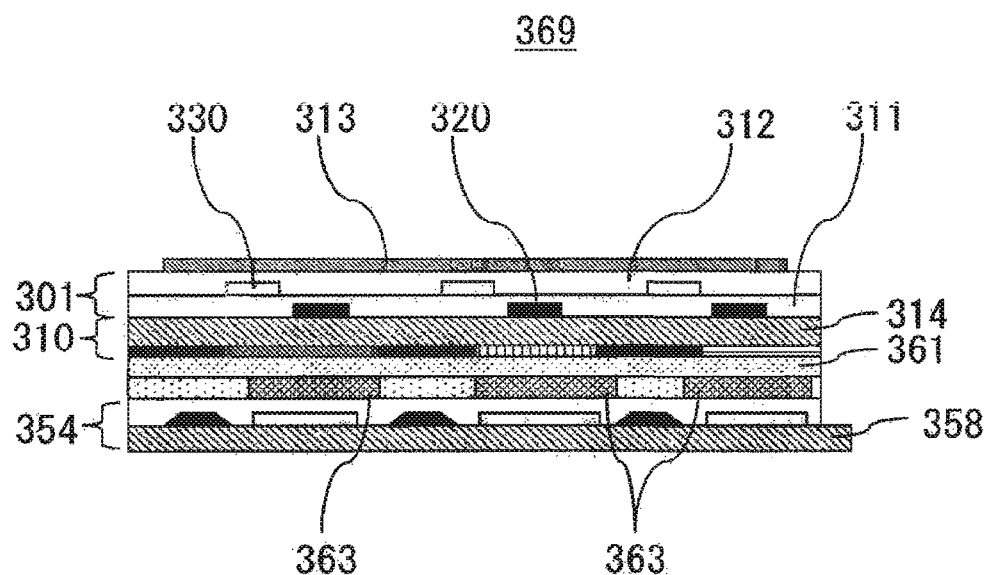
FIGS. 23A and 23B are cross-sectional views showing another configuration of a display apparatus according to a seventh embodiment.
Figure 23B:
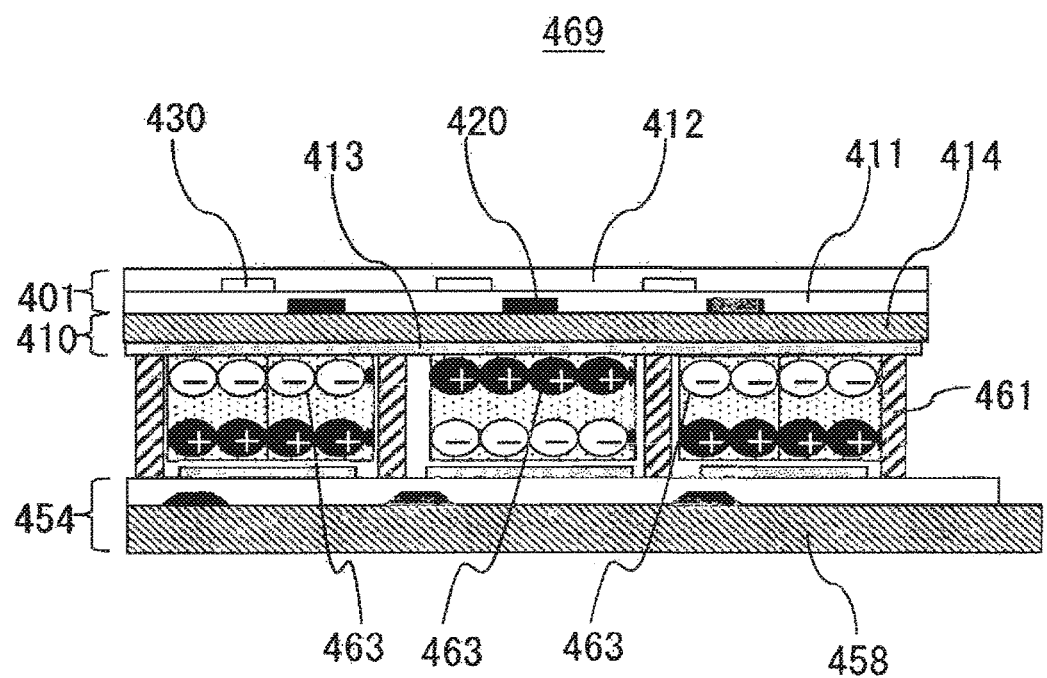

A display panel according to a seventh embodiment of the present invention is different from the other embodiments in that an organic light-emitting display (OLED), electronic paper, or the like instead of a liquid crystal panel is applied as the display panel. FIG. 23A is a cross-sectional view showing a configuration in which the present invention is applied to the organic light-emitting display. FIG. 23B is a cross-sectional view showing a configuration in which the present invention is applied to the electronic paper. Both of the display panels include a display functional layer sandwiched between two substrates facing each other and include a touch screen portion on a surface on an observer side (front side) of a substrate located on the observer side (front side), the touch screen portion being formed of detection wiring of metal wiring, an interlayer insulating film, and a protective film.

FIG. 23A shows a configuration of an organic light-emitting display 369 in which a touch screen portion 301 is integrated on a surface of an upper substrate 310 formed of a combination of a white organic light-emitting layer 363 and a color filter. A filling layer 361 and the white light-emitting layer 363 that serve as the display functional layer of the organic light-emitting display panel are sandwiched between the color filter substrate 310 and a TFT array substrate 354. A color filter layer 76 is formed on the upper substrate 314 forming the color filter substrate 310, and the color filter substrate 310 is located such that the color filter layer 76 faces the white light-emitting layer 363. The touch screen portion 301 is formed on a back surface of the upper substrate 314, namely, the surface of the upper substrate 314 opposite to the surface on which the color filter layer is formed.

FIG. 23B shows a configuration of an electronic paper panel 469 in which a touch screen is integrated. The electronic paper panel 469 includes a display functional layer sandwiched between a counter substrate 410 and a TFT array substrate 454, the display functional layer having electrophoretic particles 463 that are dispersed in regions partitioned by partition walls 461. A counter electrode 413 is formed on a surface of an upper substrate 414 forming the counter substrate 410, and the counter substrate 410 is located such that the counter electrode 413 faces the display functional layer. A touch screen portion 401 is formed on a back surface of the upper substrate 414, namely, the surface of the upper substrate 414 opposite to the surface on which the counter electrode 413 is formed.

This embodiment can also achieve a display apparatus that is thin and light, that has excellent environmental resistance, excellent detection speed of a touch position, excellent detection accuracy of a touch position, excellent display quality of an image, and excellent visibility under illumination of external light, and that can be increased in size.

The above embodiments are the exemplification in all aspects and not intended to be restrictive. The scope of the invention is indicated by the claims rather than by the foregoing description and all changes will come within the meaning and range of equivalency of the claims and therefore intended to be embraced therein.

In addition, a plurality of structural components disclosed in the above preferred embodiments can be arbitrarily combined to form the invention.

DESCRIPTION OF NUMERALS 1 touch screen portion; 2 display panel; 3 display functional portion; 8 touch screen terminal portion; 10 color filter substrate; 11 interlayer insulating film; 12 protective film; 13 upper polarizing plate; 14 transparent substrate; 20 lower wire; 20a wiring layer; 20b reflection reducing layer; 21 row-direction wire (detection wiring); 30 upper wire; 30a wiring layer; 30b reflection reducing layer; 31 column-direction wire (detection wiring); 40 shield electrode; 50 liquid crystal layer; 51 TFT array wiring; 52 sealing member; 53 lower polarizing plate; 54 TFT array substrate; 55 touch screen terminal; 56 TFT array terminal; 57 pixel electrode; 58 transparent substrate; 59 transparent substrate; 60 protective transparent substrate; 61 bonding layer; 62 backlight; 63 liquid crystal driving circuit substrate; 65 touch detection IC; 66 microcontroller; 71 black matrix; 72 Red layer; 73 Green layer; 74 Blue layer; 75 color material layer; 76 color filter layer; 77 touch screen substrate; 78a bonding layer; 78b bonding layer; 79 protective glass substrate; 80 row-direction wiring terminal; 80a wiring layer; 80b reflection reducing layer; 90 column-direction wiring terminal; 90a wiring layer; 90b reflection reducing layer; 100 display panel; 120 lower wire; 120a wiring layer; 120b reflection reducing layer; 120c upper layer film; 120d lower layer film; 130 upper wire; 130a wiring layer; 130b reflection reducing layer; 130c upper layer film; 130d lower layer film; 220 lower wire; 220a wiring layer; 220b reflection reducing layer; 230 upper wire; 230a wiring layer; 230b reflection reducing layer; 401 touch screen formation surface; 402 color filter formation surface; C1 to C8 lead-out wire; R1 to R6 lead-out wire.

The invention claimed is:

1. A display panel, comprising:
a display functional portion formed such that a display functional layer is sandwiched between a first substrate located on an observer side and a second substrate located opposite to said observer side; and
a touch screen portion that includes a lower wire and an upper wire made of a conductive metal material, that includes an interlayer insulating film located between said lower wire and said upper wire, and that includes a protective film covering said lower wire, said upper wire, and said interlayer insulating film, wherein
said first substrate has a first surface on said observer side and a second surface opposite to said first surface, and
said lower wire of said touch screen portion is formed on said first surface of said first substrate and said upper wire is formed above said lower wire and said first surface of said first substrate, and an arrangement interval between said upper wire and said lower wire in plan view is smaller than a thickness of said first substrate and is between 0.1 mm to 1 mm.

2. The display panel according to claim 1, wherein at least one of said lower wire and said upper wire has a multilayer structure including a lower layer film and an upper layer film located on said lower layer film, and a peripheral portion of said lower layer film protrudes from a peripheral portion of said upper layer film.

3. A display apparatus, comprising:
   the display panel according to claim 1; and
   a detection circuit detecting a position indicated by an indicator based on an electrostatic capacitance formed between said indicator, and said lower wire and said upper wire.

4. The display panel according to claim 2, wherein the peripheral portion of said lower layer film protrudes from the peripheral portion of said upper layer film to a distance of greater than or equal to a film thickness of said upper layer film.

5. The display panel according to claim 2, wherein said lower layer film is thinner than said upper layer film.

6. A display panel, comprising:
   a display functional portion formed of a display functional layer sandwiched between a first substrate located on an observer side and a second substrate located opposite to said observer side; and
   a touch screen portion that includes a lower wire and an upper wire made of a conductive metal material, that includes an interlayer insulating film located between said lower wire and said upper wire, and that includes a protective film covering said lower wire, said upper wire, and said interlayer insulating film, wherein
   said first substrate has a first surface on said observer side and a second surface opposite to said surface, and
   said lower wire of said touch screen portion is formed on said first surface of said first substrate and said upper wire is formed above said lower wire and said first surface of said first substrate, and
   at least one of said lower wire and said upper wire has a multilayer structure including a lower layer film and an upper layer film located on said lower layer film, and a peripheral portion of said lower layer film protrudes from a peripheral portion of said upper layer film,
   an arrangement interval between said upper wire and lower wire in plan view is smaller than a thickness of said first substrate and is between 0.1 mm to 1 mm.

7. The display panel according to claim 6, wherein the peripheral portion of said lower layer film protrudes from the peripheral portion of said upper layer film to a distance of greater than or equal to a film thickness of said upper layer film.

8. The display panel according to claim 6, wherein said lower layer film is thinner than said upper layer film.

9. A display apparatus, comprising:
   the display panel according to claim 6; and
   a detection circuit detecting a position indicated by an indicator based on an electrostatic capacitance formed between said indicator and each of said lower wire and said upper wire.

10. The display panel according to claim 6, wherein an arrangement interval between said upper wire and said lower wire in plan view is smaller than a thickness of said first substrate and is between 0.1 mm to 1 mm.

11. The display panel according to claim 6, wherein each of said lower wire and said upper wire has said multilayer structure, and said upper layer film is located on a surface of said lower layer film on said observer side.

12. The display panel according to claim 6, wherein each of said lower layer film and said upper layer film is made of metal.

* * * * *